(12) United States Patent
Montoya et al.

(10) Patent No.: US 12,073,356 B2
(45) Date of Patent: Aug. 27, 2024

(54) SYSTEMS AND METHODS FOR SUPPLY CHAIN INTELLIGENCE

(71) Applicant: Agtools Inc., Orange, CA (US)

(72) Inventors: Martha Montoya, Orange, CA (US); Gustavo Montoya, Wenatchee, WA (US)

(73) Assignee: Agtools Inc., Orange, CA (US)

( * ) Notice: Subject to any disclaimer, the term of this patent is extended or adjusted under 35 U.S.C. 154(b) by 442 days.

(21) Appl. No.: 17/369,445

(22) Filed: Jul. 7, 2021

(65) Prior Publication Data

US 2023/0014241 A1 Jan. 19, 2023

(51) Int. Cl.
| | |
|---|---|
| *G06Q 10/087* | (2023.01) |
| *G01W 1/10* | (2006.01) |
| *G01W 1/14* | (2006.01) |
| *G06N 3/08* | (2023.01) |
| *G06Q 10/0832* | (2023.01) |
| *G06V 20/10* | (2022.01) |

(52) U.S. Cl.
CPC ............ *G06Q 10/087* (2013.01); *G01W 1/10* (2013.01); *G01W 1/14* (2013.01); *G06N 3/08* (2013.01); *G06Q 10/0832* (2013.01); *G06V 20/188* (2022.01)

(58) Field of Classification Search
None
See application file for complete search history.

(56) References Cited

U.S. PATENT DOCUMENTS

| | | |
|---|---|---|
| 10,171,564 B2 | 1/2019 | Wilbur et al. |
| 10,529,036 B2 | 1/2020 | Xu et al. |
| 10,694,686 B2 | 6/2020 | Xu et al. |
| 10,769,733 B2 | 9/2020 | Ku et al. |
| 10,949,972 B2 | 3/2021 | Guo et al. |
| 11,062,223 B2 | 7/2021 | Xu et al. |
| 11,263,707 B2 | 3/2022 | Perry et al. |
| 11,769,577 B1 * | 9/2023 | Dods ............... G16H 20/10 705/50 |
| 11,829,866 B1 * | 11/2023 | Feinstein ............ G06N 3/0455 |

(Continued)

OTHER PUBLICATIONS

International Search Report and Written Opinion for International Application No. PCT/US22/36090, mailed Nov. 1, 2022 (16 pages).

(Continued)

*Primary Examiner* — Fateh M Obaid
(74) *Attorney, Agent, or Firm* — Nutter McClennen & Fish LLP

(57) ABSTRACT

A system gathers data from a plurality of sources across a wide geographic region, and produces from the gathered information output to a user, which output indicates to the user factors that may influence supply of product to, and/or operation of, a supply chain. Illustrative embodiments are able to determine that data in a previously received dataset has been changed by its corresponding data source, and subsequently update a corresponding data record maintained by the system. Illustrative embodiments train and employ one or more neural networks to identify anomalies in large datasets, and in some embodiments to predict the impact of various factors on crop production.

20 Claims, 12 Drawing Sheets
(1 of 12 Drawing Sheet(s) Filed in Color)

(56) References Cited

U.S. PATENT DOCUMENTS

| | | | |
|---|---|---|---|
| 2003/0046006 A1* | 3/2003 | Eastwood | G01V 1/32 |
| | | | 702/14 |
| 2003/0229519 A1* | 12/2003 | Eidex | G06Q 40/08 |
| | | | 705/2 |
| 2017/0132537 A1* | 5/2017 | Chavez | G06Q 40/06 |
| 2018/0316706 A1* | 11/2018 | Tsironis | H04L 63/1408 |
| 2018/0322426 A1* | 11/2018 | Schmaltz | G06Q 10/0637 |
| 2019/0325533 A1* | 10/2019 | Perry | G06Q 10/08355 |
| 2020/0334518 A1 | 10/2020 | Guan et al. | |
| 2020/0407092 A1* | 12/2020 | Bast | B65B 3/04 |
| 2021/0015024 A1 | 1/2021 | Sauder et al. | |
| 2021/0137137 A1* | 5/2021 | Leo | B01D 5/006 |
| 2021/0200173 A1* | 7/2021 | Ploegert | H04L 67/12 |
| 2023/0153980 A1* | 5/2023 | Sohn | G06V 10/454 |
| | | | 382/141 |
| 2023/0222531 A1* | 7/2023 | Cella | G06Q 10/06315 |
| | | | 705/7.31 |

OTHER PUBLICATIONS

Erdem, K., Finding Correlations in time series data, retrieved from the internet at: https://erderm.pl/2020/06/finding-correlations-in-time-series-data, published Jun. 28, 2020, 4 pages.

\* cited by examiner

SYSTEMS AND METHODS FOR SUPPLY CHAIN INTELLIGENCE

TECHNICAL FIELD

The present disclosure relates to agricultural planning and, more particularly, to systems and methods for improving agricultural planning.

BACKGROUND ART

Many supply chains across a wide variety of industries are disconnected and fragmented, which results in a lack of communication or knowledge about one or more key factors or variables that affect the supply chain, and therefore affect individual stakeholders. For example, the agriculture business in general, and specifically the specialty crop industry, generates massive amounts of data that is helpful, but inaccessible, unintelligible, and overwhelming to various stakeholders. This unusable data makes the supply chain fragmented and experience large knowledge gaps that directly impact financial decisions. Further, in volatile commodities industries, such as the specialty crop market, nearly all stakeholders work on thin profit margins, which is their biggest operations pain point.

To use existing, conventional systems of data research in the specialty crop market, stakeholders have a cadence throughout their business day to check various data sources, which tends to be time-consuming, inaccurate, and incomplete. For example, farmers or growers begin their days very early in the morning by communicating with individual industry connections and checking government agencies and industry group sources for the most current information they can find on their crop or commodity of interest. However, that information is incomplete because it extends only as far as the farmer or grower's network of connections and the official government or industry data and also can be inaccurate because it relies on human subjectivity and potentially inaccurate data reported to those government or industry sources.

Many of these stakeholders, like farmers in volatile commodities industries, improve yields or operations year over year, but their profit margins remain stagnant or decrease. Each stakeholder invests a significant amount of resources in researching and analyzing the data from the incomplete, inaccurate, and potentially subjective sources. These stakeholders would benefit if they could make informed financial decisions based on high fidelity, analyzed, curated data that increase their profit margins.

For example, farmers have historically considered weather patterns in making agricultural decisions. For example, a meteorologist's prediction of frost or snow in the spring may lead a farmer to delay planting a crop, and a prediction of frost or snow in the fall may lead a farmer to accelerate the crop harvest. Moreover, both near-term and long-term predictions are historically limited in scope, such as those that predict basic factors such as temperature and precipitation, and even those predictions come with a wide range of reliability.

Longer-range weather predictions (i.e., more than a few days into the future) are unreliable, and so farmers place little if any reliance on long-range predictions.

Other stakeholders in the agricultural chain would like to have more insight as to production volume, quality or grade of produce, harvest time and delivery time, to name but a few factors. For example, a buyer for a food retailer would like to know what quantity of agricultural produce to expect from a given source, the expected life of the produce (i.e., how long will the produce remain saleable, which impacts how long the produce can spend in shipping channels and on store shelves, which in turn may influence the choice of market to which to send the produce), when to expect that produce, and the quality or grade of that produce. Shippers and other suppliers would also benefit from advance visibility of such factors in order to schedule transportation resources, order shipping containers, and in turn be able to plan for their cash flow. Such participants are, undesirably, even further removed from understanding the impact of weather and other factors on production. Consequently, any such party would benefit from receiving more, and more-timely, data than is presently available to them, and in an easily useable format.

SUMMARY OF VARIOUS EMBODIMENTS

In accordance with an illustrative embodiment discloses a method of providing timely information to a participant in an agricultural supply chain. The method includes receiving, at a computer system, a plurality of datafiles from a plurality of remote sources, the plurality of datafiles being received datafiles, each received datafile of the received datafiles containing an initial dataset from a corresponding one of the remote sources, and having a corresponding electronic file format.

For each received datafile, the method includes operating one or more processors to execute code to: extract the initial dataset and translate the initial dataset into a uniform data format to produce an initial translated dataset; and store the initial translated dataset into computer memory as part of a common dataset.

The method also includes operating one or more processors to execute code to evaluate, using the one or more processors, an evaluated dataset to identify a set of one or more anomalies, each an identified anomaly, the evaluated dataset being one of the initial dataset or the initial translated dataset; access a profile of a user, the user profile identifying an agricultural attribute; identify an anomaly that correlates to the agricultural attribute identified in the user profile, said anomaly being an identified anomaly; and thereafter to output the identified anomaly to a user device.

In some embodiments, the evaluated dataset includes weather data for a specified geographic region, and the anomaly includes an anomaly within the weather data.

In some embodiments, the evaluated dataset includes a set of data items, each data item in the set of data items having an expected quantitative range for the specified agricultural attribute, and an anomaly includes a data item having a quantitative value that is outside of its expected quantitative range. In such embodiments, to evaluate the evaluated dataset to identify one or more anomalies includes comparing each data item in the evaluated dataset to its expected quantitative range, and identifying as an identified anomaly each data item that has a quantitative value that exceeds its expected quantitative range. In some such embodiments, the evaluated dataset includes a data item reporting a quantitative value of rainfall in a specific geographic location (a rainfall data item), and the expected quantitative range includes an expected quantity of rainfall at that specific geographic location (the expected rainfall range). Further, comparing each data item in the set of data items from the evaluated dataset to its expected quantitative range includes comparing the rainfall data item to the expected rainfall range; and identifying as an anomaly each rainfall data item that falls outside of the expected rainfall range.

In some embodiments, each evaluated dataset includes a set of data items, each data item in the set of data items having an expected quantitative value, and an anomaly includes a data item that deviates by at least a corresponding quantitative amount from its expected quantitative value. In such embodiments, to evaluate the evaluated dataset to identify one or more anomalies includes comparing each data item in the evaluated dataset to its expected quantitative value, and identifying as an identified anomaly each data item that deviates from its expected quantitative value by at least its corresponding quantitative amount.

In some embodiments, the evaluated dataset includes data items relating to the specified agricultural product for transport by the agricultural supply chain; and to evaluate the evaluated dataset to identify one or more anomalies includes evaluating the evaluated dataset with a neural network trained to detect anomalies in data items relating to the specified agricultural product.

In some embodiments, the evaluated dataset includes data items relating to a specified agricultural product for transport by the agricultural supply chain, the specified agricultural product having a plurality of phenological phases; and to evaluate the evaluated dataset to identify one or more anomalies includes evaluating the initial dataset with a neural network trained to detect anomalies in data items relating to a specified phenological phase of the specified agricultural product, the specified phenological phase being one of the plurality of phenological phases.

In some embodiments, the method further includes storing a snapshot of each initial translated dataset; and at a time subsequent to receiving the plurality of datafiles from a plurality of remote sources, receiving at the computer system an updated datafile corresponding to a one of the received datafiles, the updated datafile including a corresponding updated dataset. The method includes subsequently: comparing the updated dataset to a corresponding snapshot; identifying a set of data items in the updated dataset that are different from corresponding data items in the corresponding snapshot (the identified differences) between the snapshot and the updated dataset; and updating the common dataset by replacing in the common dataset each such corresponding data item the with data items in the updated dataset that is different from corresponding data item.

Some embodiments further include generating a hash, said hash being the earlier hash, of each initial dataset; and at a time subsequent to receiving the plurality of datafiles from a plurality of remote sources, receiving at the computer system a plurality of subsequent datafiles, each subsequent datafile including a subsequent dataset corresponding to the initial dataset of a corresponding one of the received datafiles, at least one of the subsequent datasets being an updated version of its corresponding initial dataset; generating a later hash for each subsequent dataset; identifying a set of subsequent datafiles having an updated dataset by comparing, for each initial translated dataset and its corresponding subsequent dataset, the initial hash to the later hash. Such embodiments include subsequently, for each subsequent datafile having an updated dataset: comparing the updated dataset to a corresponding snapshot; identifying differences, said differences being identified differences, between the snapshot and the updated dataset; and updating the common dataset with the identified differences to produce an updated common dataset.

In some embodiments, to output the identified anomaly to a user device includes causing display of the identified anomaly in a visual format specified by the user profile corresponding to a user of the display device.

In some embodiments, to output the identified anomaly to a user device includes providing the identified anomaly in an alert message to the user of the display device.

In some embodiments, to output the identified anomaly to a user device includes causing display of the identified anomaly on a display device pursuant to timing information previously specified by a user of the display device.

In some embodiments, to output the identified anomaly to a user device includes causing display of the identified anomaly on a display device pursuant to user habits learned by the system over time.

Some embodiments further include providing an alert contemporaneously with causing display of the selected anomalies.

In some embodiments, the user profile includes an agricultural attribute specified by a user, and in some embodiments the user profile includes a user's subscription to a specified agricultural attribute.

In some embodiments, to access a user profile identifying at least one agricultural attribute includes accessing a user application instance on a user's device having the user profile; and to output the identified anomaly to a user device includes causing display to the user of the identified anomaly on the user's device.

Another embodiment discloses a computer-implemented system including a computer system configured to execute computer-executable instructions which instructions, when executed, cause the computer system to execute a method, the method including: receiving, at the computer system, a plurality of datafiles from a plurality of remote sources, the plurality of datafiles being received datafiles, each received datafile of the received datafiles containing an initial dataset from a corresponding one of the remote sources, and having a corresponding electronic file format; and for each received datafile: extracting the initial dataset and translating the initial dataset into a uniform data format to produce an initial translated dataset; and storing the initial translated dataset into computer memory as part of a common dataset; evaluating the initial dataset to identify one or more anomalies (each an identified anomaly); accessing a user profile identifying at least one agricultural attribute; selecting a set of anomalies (the selected anomalies), each anomaly of the selected anomalies being an identified anomaly that describes the agricultural attribute identified in the user profile; and thereafter outputting the identified anomaly to a user device.

Some such embodiments further include a computer-implemented neural network, the neural network configured to evaluate the initial dataset to identify one or more anomalies in data items relating to a specified phenological phase of a specified agricultural product, the specified phenological phase selected from a plurality of phenological phases for the specified agricultural product.

Another embodiment includes a non-volatile storage medium configured to store computer-executable instructions, which computer-executable instructions, when executed by a computer processor, cause the computer processor to execute a method, the method including: receiving, at the computer system, a plurality of datafiles from a plurality of remote sources, the plurality of datafiles being received datafiles, each received datafile of the received datafiles containing an initial dataset from a corresponding one of the remote sources, and having a corresponding electronic file format; and for each received datafile: extracting the initial dataset and translating the initial dataset into a uniform data format to produce an initial translated dataset; and storing the initial translated dataset into computer memory as part of a common dataset; evaluating the initial dataset to identify an anomaly, said anomaly being an identified anomaly; accessing a user profile identifying at least one agricultural attribute; and thereafter outputting the identified anomaly to a user device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing features of embodiments will be more readily understood by reference to the following detailed description, taken with reference to the accompanying drawings, in which.

DETAILED DESCRIPTION OF ILLUSTRATIVE EMBODIMENTS

Figure 1A:
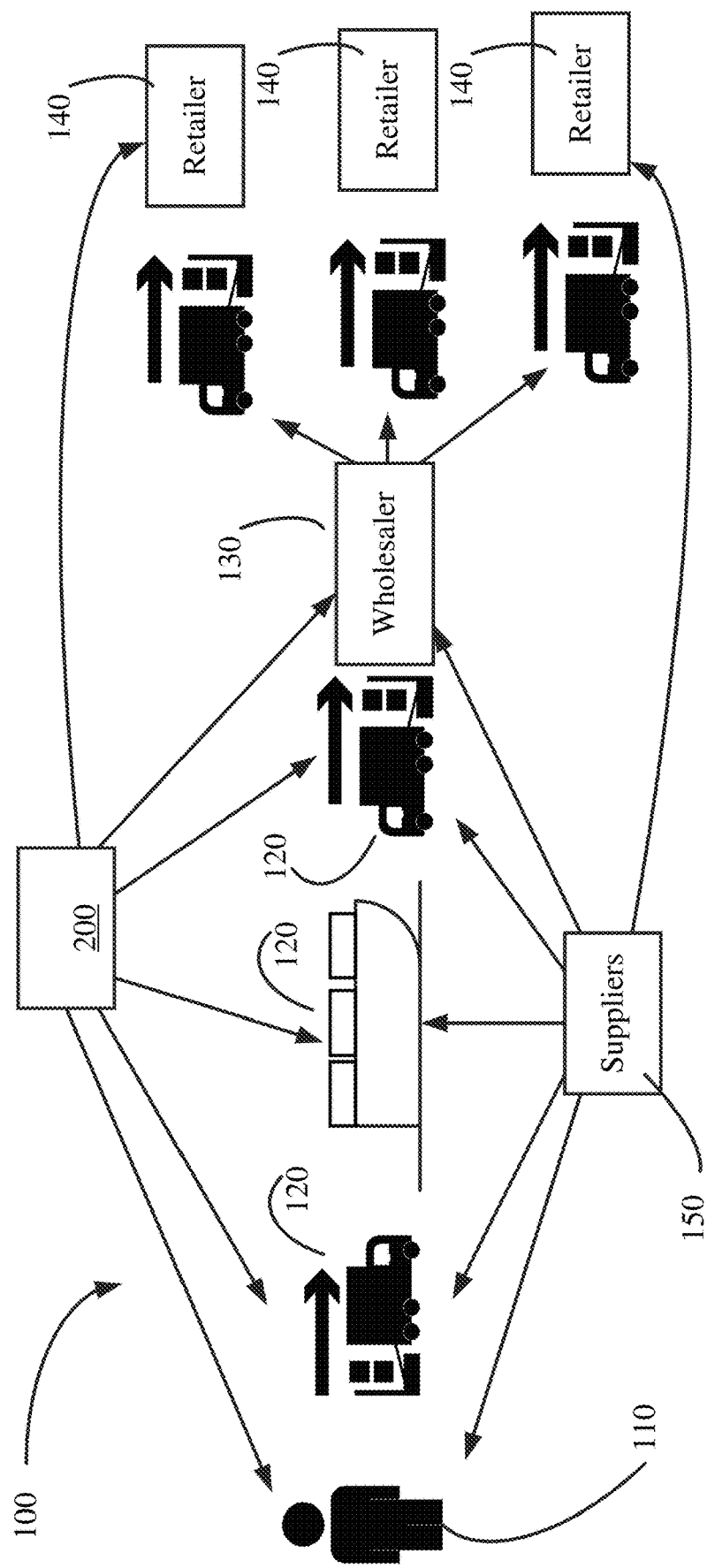
FIG. 1A schematically illustrates an agricultural supply chain.

Illustrative embodiments provide timely information to participants and decision makers in a supply chain. Systems and methods for producing such information improve over prior art systems and methods in that they replace subjective human judgment with objective analysis and results of a wide range of factors that impact production and delivery by the supply chain.

Illustrative embodiments are described in terms of an agricultural supply chain, but embodiments are not limited to agricultural supply chains, but instead are applicable to a wide variety of supply chains.

Illustrative embodiments provide a supply chain solution that helps aggregate, analyze, determine recommendations, and output customized data and alerts to users in real-time. Illustrative embodiments of a system take 140+ million records related to the specialty crop supply chain and aggregate, validate, and analyze the records in a way that aligns with a user's customized needs. This customized user supply chain data helps inform the users in a timely fashion to make financial decisions that optimize the value of each purchase.

Some embodiments include the training or, and/or use of, one or more neural networks for evaluating data, as described herein. There are several benefits to using such a trained neural network. For example, the inventors have found that a trained neural network is better able to evaluate large and complex datasets, and is better able to detect subtle issues within the datasets (e.g., anomalies; factors that increase or decrease a production estimate) than other known methods. Moreover, a trained neural network is able to evaluate data faster than some other methods (e.g., faster than doing a direct, datum-by-datum comparison of data against a standard). In addition, as compared to people (e.g., farmers; shippers; buyers; sellers) making their own, subjective predictions of have a given factor will impact crop production, using a trained neural network renders a prediction that is more objective, and if that information is provided to multiple participants in a supply chain, all such participants may rely-on, and work and plan from the same information and thereby work more harmoniously, with less wasted time, effort and material.

Definitions: As used in this description and the accompanying claims, the following terms shall have the meanings indicated, unless the context otherwise requires.

An "agricultural attribute" is an attribute describing an aspect of an agricultural product or the growth or production of an agricultural product. Some agricultural attributes are quantitative, such as a weather condition (e.g., temperature; humidity; hours of daylight) at a geographic location where the agricultural product is being grown, or the shipping quantity or shipping weight of the agricultural product, to name but a few examples. Some agricultural attributes are qualitative, for example the name of the agricultural product (e.g., apple; orange; strawberry; avocado).

A "datafile" is an electronic file, having an electronic file format and storing at least one dataset.

The term "dataset" means payload data stored within a datafile.

The term "data structure" means the structure of a dataset. Examples of data structure include, without limitation, a data listing (e.g., in a PDF document, a Word document, or in an html file); a table (e.g., in a Word document); a spreadsheet (e.g., in an Excel document), and a database.

The term "electronic file format" means a format of an electronic file. Example of electronic file format includes, without limitation, the ".doc" format of a Word document; the ".xls" format of an Excel spreadsheet, etc.

A "set" includes at least one member.

The term "graphical display" means a display that communicates some or all of its information is graphical form. Examples of a graphical display include, without limitation, a pie chart in which information is conveyed according to the size of one or more slices, a bar chart in which information is conveyed according to the size of one or more bars, and a graph in which information is conveyed by one or more traces (e.g., lines; curves) specifying the relationship between the units of two or more axes. Data displayed in text, even in a table or spreadsheet, is not a "graphical display" unless that text also includes a graphical element (e.g., a color or background shading, for example) to graphically indicate some information not relayed by the text alone. The phrase to display something "graphically" or in a "graphical" display shall have meanings correlative to the foregoing.

Supply Chain Overview

FIG. 1A schematically illustrates an embodiment of an agricultural supply chain 100 that may include a set of participants or stakeholders, such as a source 110 of agricultural product, wholesalers 130, and/or retailers 140. Other supply chains may include fewer or more participants or stakeholders.

The supply chain 100 also includes shippers 120 that move agricultural products from the respective sources 110 of those agricultural products. Shippers 120 may employ and provide to the supply chain resources such as, for example, trucks, trains, and ships, to name but a few examples. Some shippers 120 obtain agricultural product from one or more sources 110, and some shippers 120 deliver the agricultural product to another shipper, or to a wholesaler 130 or retailer 140. Some shippers 120 obtain agricultural product from one or more wholesaler 130 and deliver them to one or more retailers 140. Retailers 140 may include supermarkets, farmers' markets, grocers, and restaurants, to name but a few examples.

Moreover, one or more suppliers 150 may supply product to any one or more participants in the supply chain 100. For example, a supplier 150 may provide boxes, crates, pallets or other shipping containers to a supplier 110, shipper 120, wholesaler 140 or retailer 140.

The supply chain 100 in the illustrative embodiment of FIG. 1A begins with a source 110 of agricultural product. The source 110 may be, for example, a farmer or grower of the agricultural product, or an agricultural cooperative, to name but a few examples.

Agricultural products include any product grown on a farm, such as fruits and/or vegetables to name but a few examples. A farm may be a traditional farm having fields, or a facility such as a greenhouse, a hydroponics facility, or an aquaponics facility, to name but a few examples. Agricultural products include for example, fruits and vegetables, such as strawberries, avocados, corn, beans, tomatoes, apples, oranges, and bananas, to name but a few examples. Some agricultural products have more than one variety and/or grade as known in the agricultural industry. For example, a strawberry may be grade A, grade B, or grade C.

In illustrative embodiments, the life of each type of agricultural product proceeds according to a set of phenological phases, although not all agricultural products have all phrenological phases. For example, phases 2 and 3 (Formation of side shoots and Stem elongation, respectively) are not applicable to strawberries.

In illustrative embodiments, the phenological phases include:

Phase 0. Germination;
Phase 1. Leaf development;
Phase 2. Formation of side shoots;
Phase 3. Stem elongation;
Phase 4. Development of harvestable vegetable plant parts etc.;
Phase 5. Inflorescence emergence (main shoot)/heading;
Phase 6. Flowering/main shoot;
Phase 7. Development of fruit;
Phase 8. Ripening or maturity of fruit and seed;
Phase 9. Senescence, beginning of dormancy;
Phase 10. Harvest; and
Phase 11. Storage.

Each source 110 of agricultural product, and the agricultural product or products produced by each such source 110, has an associated geographic location on the Earth. For example, one such source 110 may be located in Colombia, and another such source 110 may be in California, USA, and another such source 110 may be in Ukraine, to name but a few illustrative examples.

There are several factors that impact development (e.g., growth) of an agricultural product. The factors have different impact at different phenological phases. For example, factors may include UV index; precipitation; wind speed; altitude; moon phase; and sunlight hours/day, to name but a few examples. Moreover, the factors may impact an agricultural product differently based on the agricultural product's geographic location. For example, weather may impact growth of a strawberry crop in California, USA differently than it impacts growth of a strawberry crop of the same strawberry variety in Colombia due to differences in weather, season, and/or other factors in those different geographic locations.

Each member of a supply chain 100 may benefit from knowing quantifiable information about crops of sources 100. For example, a shipper 120 may benefit from knowing how much (i.e., volume) of a given agricultural product will be produced by a set of sources 110 of that agricultural product, and when that volume of agricultural product will be harvested and ready for shipping. The shipper 120 may then be able to anticipate the timing and shipping needs desirable to acquire, transport, and deliver that agricultural product to another participant in the supply chain 100. Among other things, the ability to anticipate that timing and the shipping needs allows the shipper 120 to avoid over-commitment (e.g., supplying to much) of shipping resources, to avoid under-commitment (e.g., supplying to little) of shipping resources, to avoid to avoid stranding shipping resources at a source 110 before the agricultural product is ready to ship, and/or to avoid supplying shipping resources at the source 110 too late (e.g., after the agricultural product is ready for shipping). Among other benefits, the ability to supply shipping resources (e.g., trucks, trains, aircraft, ships) and the personnel that operate those resource, at the right time and in the right quantity helps shippers 120 to reduce their respective carbon footprints by avoiding wasteful moving and provision of those shipping resources.

As another example, a supplier 150 may also benefit from knowing how much (i.e., volume) of a given agricultural product will be produced by a set of sources 110 of that agricultural product, and when that volume of agricultural product will be harvested and ready for shipping. The supplier 150 may then be able to anticipate the timing and container needs desirable to supply shipping containers to a participant in the supply chain 100.

As another example, a wholesaler 130 and a retailer 140 may also benefit from knowing how much (i.e., volume) of a given agricultural product will be produced by a set of sources 110 of that agricultural product, and when that volume of agricultural product will be harvested and ready for shipping, in order to anticipate when the agricultural product will arrive at the wholesaler 130 or retailer 140, the variety of the agricultural product, the grade of the agricultural product, and the quantity of the agricultural product. For example, with that information, a restaurant may be able to more efficiently plan its menu.

In the past, such supply chain participants have not had sufficient sources of the information to determine how much (i.e., volume) of a given agricultural product will be produced by a set of sources 110 of that agricultural product. For example, a typical farmer will spend time each morning calling his or her contacts to gather information from those contacts regarding factors that may influence the farmer's crop development. Such factors may include, for example, forecasted rain, sun, wind, cloud cover, etc., but the information learned by the farmer is limited to the information that can be supplied by the farmer's contacts or other sources available to the farmer. Moreover, the farmer's neighbor, in the same geographic area and subject to the same weather conditions, may obtain different forecasted information.

Moreover, even given the information available to it, a supply chain participant's conventional estimation of volume or timing is subjective at best, based on that participant's experience and assumptions. A farmer, and the farmer's neighbor, in the same geographic area and subject to the same weather conditions and possessing the same forecasted information, may each make different estimates of the volume crop production and/or grade of produced agricultural product, and/or the projected harvest date.

In contrast, embodiments of the supply chain intelligence system 200 improve over conventional systems and methods by producing accurate and objective forecasts of, for example, timing of the advancement of a growing crop through that crop's phenological phases, crop volume, and/or harvest date, to name but a few examples.

The inventors also note that each supply chain participant has its own objectives, priorities and subjective viewpoint on past, present and future growth of their respective agricultural crop. In effect, supply chain participants benefit greatly from having an objective source for data. To depend on agents, and other farmers, both in the same geographic region, or a distant geographic region, is not a truly valid method of determining the correct data. Each participant in the food supply chain has its own financial objective and that objective is rarely aligned with other participants in the food supply chain. Precisely because of this situation, a system, process or service offering of a purely objective data source is valuable.

Figure 1B:
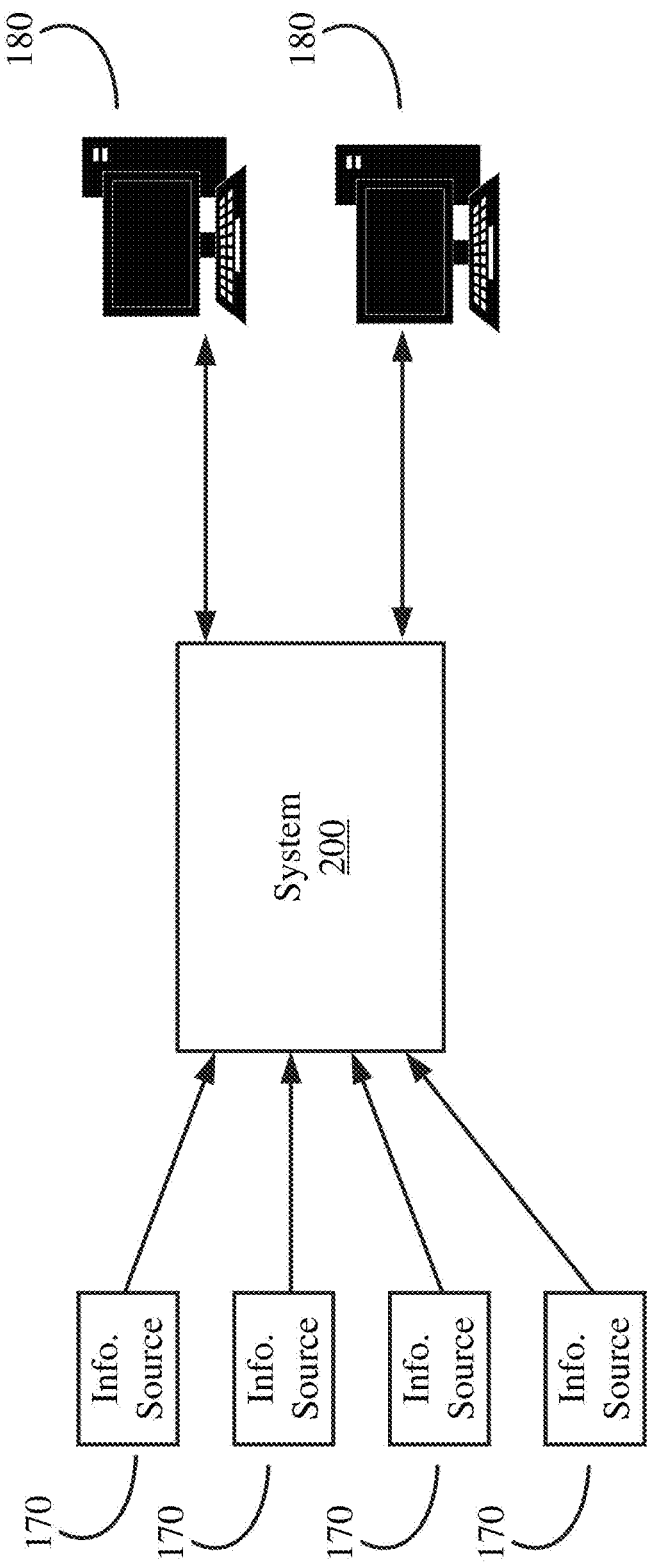
FIG. 1B schematically illustrates an embodiment of a system disposed between information sources and information consumers.

FIG. 1B schematically illustrates an embodiment of a supply chain intelligence system 200 disposed between information sources 170 and information consumers 180. The information consumers 180 may be, for example, participants in the supply chain 100. As described in more detail below, the supply chain intelligence system 200 obtains, from a plurality of sources 170, data relating to one or more agricultural products, processes that information, for example using a set of rules, and provides outputs to one or more information consumers 180.

The supply chain intelligence system 200 may obtain the agricultural data from a source 170 by one or more of a variety of ways. For example, the supply chain intelligence system 200 may obtain the agricultural data from a source 170 by scraping data posted by the source 170, and/or by transferring data from the source 170 via an application program interface ("API").

Figure 1C:
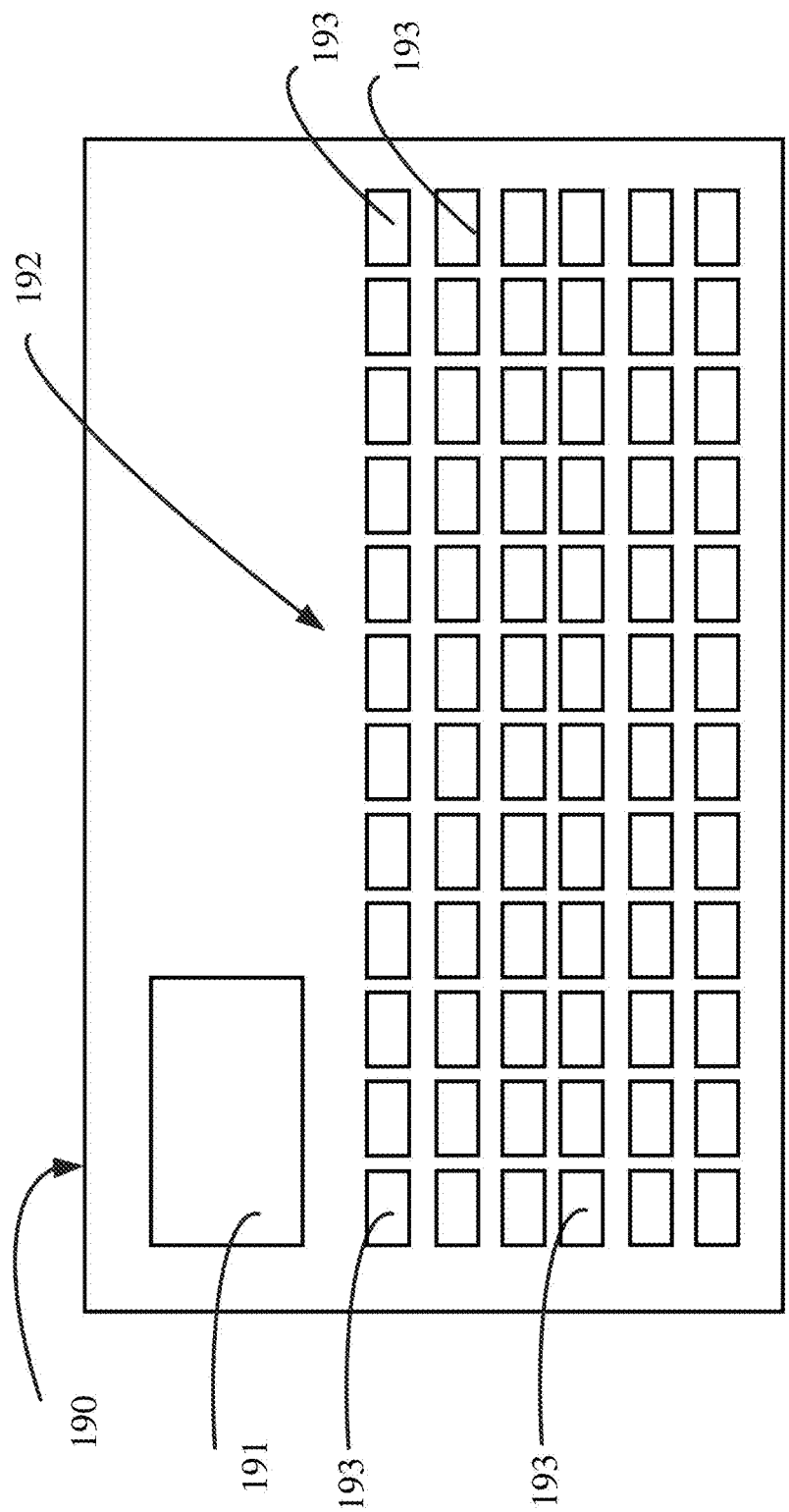
FIG. 1C schematically illustrates an embodiment of a datafile.

Agricultural data obtained by the supply chain intelligence system 200 may be in a variety of forms. For example, FIG. 1C schematically illustrates an embodiment of a datafile 190.

The datafile 190 includes a set (or "dataset") of payload data items 193, which may be referred-to collectively as "payload data" 192, and each of which may be referred-to as a payload "data item" or a "datum." The dataset 192 may have a "data structure" as that term is defined herein. The datafile 190 may have a specified "electronic file format" as that term is defined herein.

The datafile 190 may include signature data 191. The signature data 191 is distinct from the payload data. The signature data 191 uniquely identifies each datafile 190 from other datafiles, and may be used to distinguish one version of a datafile from another version of that datafile. The signature data 191 may include, for example, an identifier of the source of the datafile (e.g., a specific farm or grower, or other participant in or supplier to a supply chain 100); the date on which the datafile 190 was created or made available; an identification of the subject matter of the datafile (e.g., an identifier of the agricultural product, and/or the variety of agricultural product, and/or a the grade of the agricultural product.

Supply Chain Intelligence System

Figure 2:
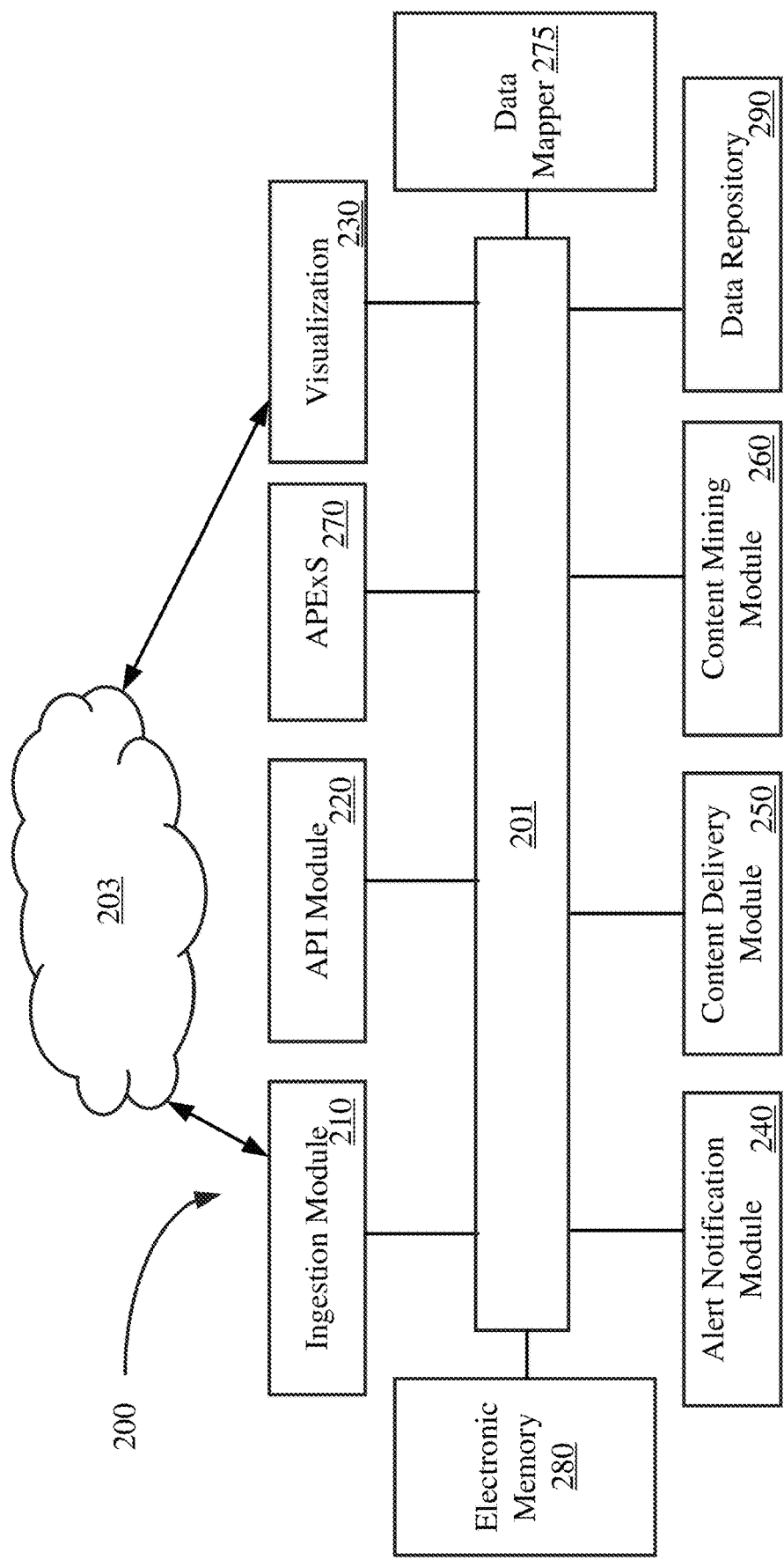
FIG. 2 schematically illustrates an embodiment of a system.

FIG. 2 schematically illustrates an embodiment of a supply chain intelligence system 200. The system 200 may be implemented, at least in part, using a computer having a computer processor, such as a microprocessor as manufactured by Intel or AMD, for example, computer memories, input devices such as a keyboard and a mouse, and a display device such as a computer monitor. The electronic memory 280 may store computer-executable instructions that, when executed by the computer processor, cause the system to perform processes (e.g., methods).

An illustrative embodiment of the supply chain intelligence system 200 includes several technology stack systems (or modules) in communication with one another via an interface 201. The technology stack systems include: data collection (Ingestion Module) 210, data validation (Clean Data Repository) 290, data analysis (Advanced Phenological Expert System, APExS) 270, content mining modules (which may include APExS and other sources) 260 that are relevant to the identified variables; a prediction module using artificial intelligence (AI) and machine learning (ML) (alert notifications module—ANS) 240; content delivery module (CDS) 250; and visualization tools 230. Illustrative embodiments of the supply chain intelligence system 200 rely on one or more of exceptional data collection, aggregation, analysis, and AI/ML techniques to provide data driven solutions based on consumer or user needs in the target commodities industry. Illustrative embodiments of the supply chain intelligence system 200 include one or more network interfaces to communicatively couple with a network 203 (which may be a local area network, a wide area network, or the Internet, to name but a few examples).

Figure 3:
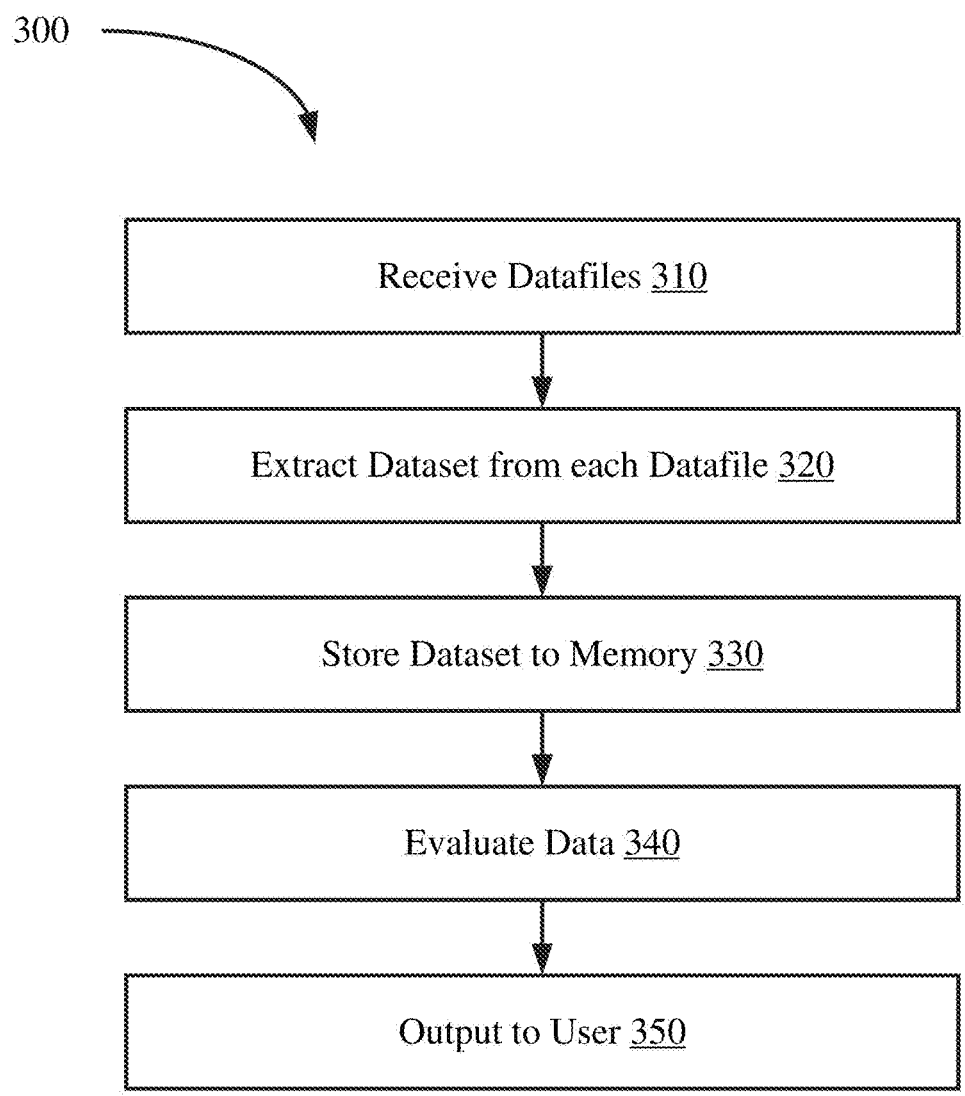
FIG. 3 is a flowchart of an embodiment of operation of an embodiment of a system.

FIG. 3 is a flowchart that illustrates an embodiment of a method 300 of operation of a system 200. At step 310, the system 200 receives a plurality of datafiles 190 from a plurality of sources 170. Each datafile 190 includes a dataset 192 that includes a set of data items 193. In some embodiments, one or more of the plurality of datafiles 190 includes signature date 191.

At step 320, the system 200 extracts a dataset 192 from each datafile 190 of the plurality of datafiles.

Figure 1D:
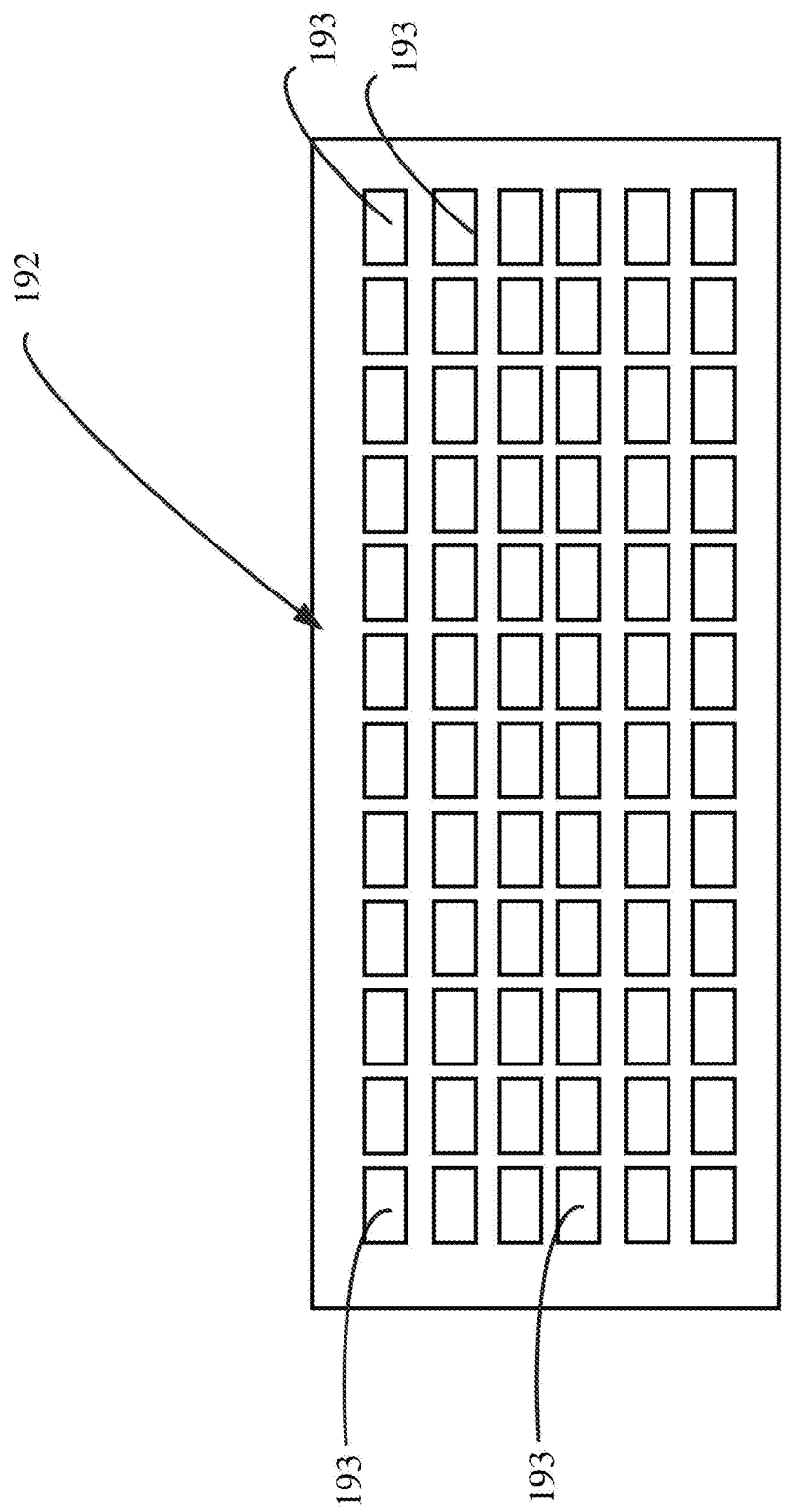
FIG. 1D schematically illustrates an embodiment of a dataset in a uniform data format.

At step 330, the system 200 stores the extracted dataset to memory, along with other extracted datasets. Some embodiments format (or reformat) each extracted dataset 192 into a uniform data format, so that all extracted datasets 192 have the same format. Having the same, uniform data format facilitates the ability of the system 200 to access data items within the extracted datasets 192. An embodiment of an extracted dataset 192 in a uniform format is schematically illustrated in FIG. 1D. In FIG. 1D, the data items 193 are organized into rows and columns. In this illustrative embodiment, each data item 193 is in a row i and a column j, so that each data item has a corresponding index (i, j).

Figure 1E:
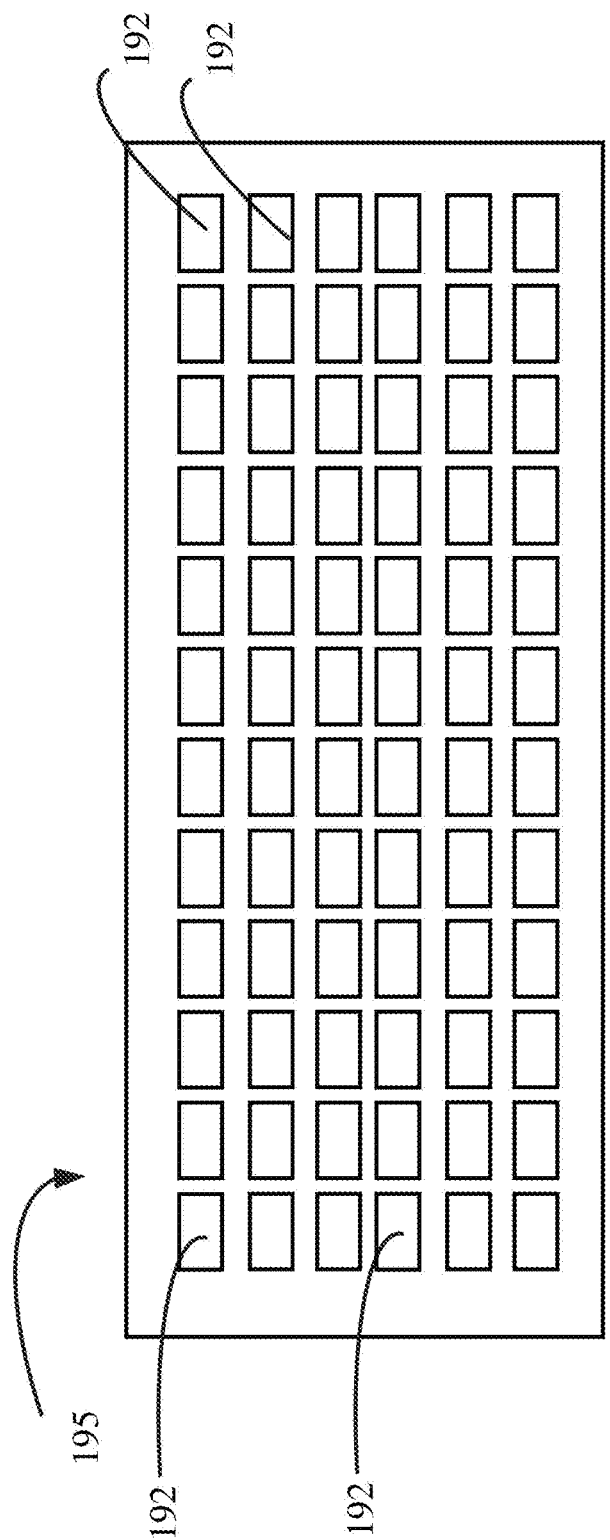
FIG. 1E schematically illustrates an embodiment of a clean data.

The set of extracted datasets 192 form a common dataset 195, as schematically illustrated in FIG. 1E. Illustrative embodiments store the common dataset to a clean data repository 290.

At step 340, the system 200 evaluates the stored data. The evaluation of the stored data may include, for example, identifying a set of anomalies within the stored data, and/or predicting an impact of the data on agricultural product production and/or the supply chain.

At step 350, the system 200 causes an output to be provided (e.g., displayed) to a user. For example, an output may be displayed to a user through a web browser, or other application on the user's device. In some embodiments, the user is a subscriber to the system 200, and the system's output is defined by the subscriber, or a subscriber profile maintained by or available to the system, and/or based on an understanding by the system 200 pursuant to the subscriber's past use of the system.

Returning to FIG. 2, embodiments of system component modules are described below. Each component may be described as a system or sub-system.

Ingestion Module 210

Illustrative embodiments of the supply chain intelligence system 200 include an ingestion module (or "ingestion tool") 210 which acquires data collection input from outside sources 170, such as government agencies, trusted industry sources, and a source 110 of agricultural product, to name but a few examples. Such sources 170 may report in different time ranges, such as quarterly, monthly, weekly, daily and hourly to list but a few examples. Specific to the specialty crop industry, one illustrative embodiment of the supply chain intelligence system 200 relies on thirty-nine sources 170 to automatically collect this data in different formats and considers additional sources when relevant to the identified variables that affect the specialty crop supply chain. The ingestion module 210 may acquire data using an application program interface (i.e., the ingestion module 210 is API friendly), when available, to allow for access to data across a wide variety of platforms. In other embodiments, the ingestion module 210 scrapes data from sources without use of an API.

The ingestion module 210 collects data from downloads in multiple electronic file formats (for example, CSV, Excel, TXT, PDF) and by using scraping techniques to crawl and find data on whitelisted or webpages of validated sources.

Some embodiments of the ingestion module 210 incorporate a clean data repository system 290 in which the system 200 collects massive data records and ensures security across the other technology stack systems so users access the data and other tools safely. The clean data repository 290 uses a secure framework across all of its technology stack systems.

Data Mapper (Contextualization Module) 275

Additionally, the ingestion module 210 feeds into a contextualization module that implements a data mapper function. The contextualization module 275 may be part of the ingestion module 210. The data mapper function may couple with the APExS module 270 (described below), and the agricultural data from sources 170 feeding the ingestion module 210, to build a comprehensive "homologation" or "converters" to contextualize data sets into categories of user context. The data mapper function allows for all commodities and their packaging descriptions, sizes, varieties, etc. be correlated using any format, any language (multi-language support and multi-measuring unit support).

In some embodiments, the data mapper function converts some or all of the dataset in a datafile to a format that is beneficial to the consumer of the output of the supply chain intelligence system 200. For example, the quantity of an agricultural product reported in a datafile may be specified by the source 170 of the datafile in kilograms, but a consumer 180 of the output of the supply chain intelligence system 200 may need that quantity specified in pounds. The data mapper function consequently converts the reported quantity from kilograms to pounds.

In some embodiments, the data mapper function supplements the dataset in the datafile, instead of or in addition to converting some or all of that dataset. For example, in some embodiments the data mapper function recognizes (e.g., based on the signature data 191 of the datafile 190, or based on automatic text analysis of the dataset) that the subject matter of the datafile is, or includes, data about strawberries from a specific geographic region. Based on that recognition, the system will know or infer (a) the variety of strawberry, since the system has information indicating that the specific geographic region produces a specific variety of strawberry, and (b) the units in which strawberries from that geographic region are specified (for example, kilograms, not pounds; "dozen" not "12"), etc. This allows the supply chain intelligence system 200 to automatically convert, and even supplement (e.g., by adding the variety of produce, if that variety is not identified in the dataset) data in the dataset, so that the resulting data is in a format (and contains additional information not in the original dataset) useful to the supply chain intelligence system 200 and its consumers 180.

Consequently, the mapper function enables the supply chain intelligence system 200 to automate the conversion and data supplementation process described above, which processes used to require human input.

API Module 220

Some embodiments include an API module 220, which is configured to retrieve datafile from a source 170 via an application program interface.

Advanced Phenological Expert Module 270

Illustrative embodiments of the supply chain intelligence system 200 include an Advanced Phenological Expert System (APExS) 270 that is, among other things, a scientific repository holding thousands of records across dozens of variables that affect each of the specialty crops' various phenological phases.

APExS 270 provides intelligence and analytics to the data mapper (discussed above) and the alert notification system (discussed below) and, in some embodiments, relies upon a machine learning technique based on a crowd sourcing function across the entire user group for the supply chain intelligence system 200 that is relevant to the variable or commodity being analyzed. The APExS module 270 transforms variables that affect the supply chain into intelligible data and recommendations or alerts based on that data.

The APExS module 270 implements a cognitive process that, in some embodiments, is developed with artificial intelligence, machine learning, and/or industry experience (e.g., assumptions, correlations, etc.).

Some embodiments rely on regression techniques to analyze and model data. For the variables affecting the supply chain that are known to be more stable, a linear regression technique, such as linear square fit estimation modeling, for one or multiple variables is used. For the variables affecting the supply chain that are more volatile, the APExS module 270 employs a non-linear regression technique. The output of the APExS module 270 helps the supply chain intelligence system 200 provide customized and high-fidelity data analysis, recommendations, and alerts to users 180.

In some embodiments, the APExS module 270 accepts inputs of agricultural attributes that impact the supply of an agricultural product from a certain source 170, and transforms those inputs into a prediction of the crop yield from that source 170. Generally, a grower of an agricultural product has a quantitative estimate of the production of that agricultural product for each growing season. Various factors may influence that production, however. For example, environmental factors over the course of the growing season, and over the course of each phenological stage of the agricultural product, may result in an increase or a decrease of the production. Such factors may include, for example, temperature; humidity; amount of sunlight each day, and other factors, to name but a few examples.

Figure 8A:
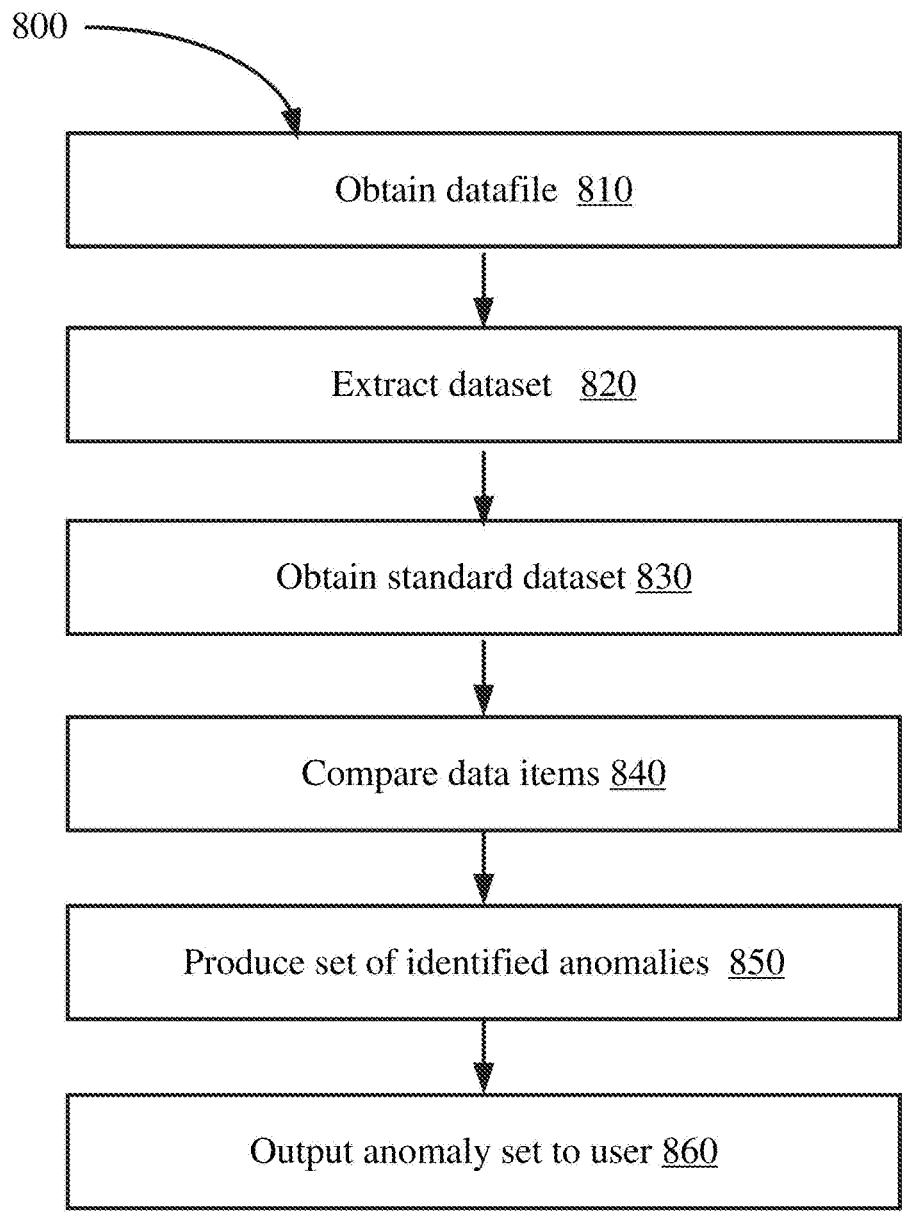
FIG. 8A is a flowchart of an embodiment of a method of detecting an anomaly in data.
Figure 8B:
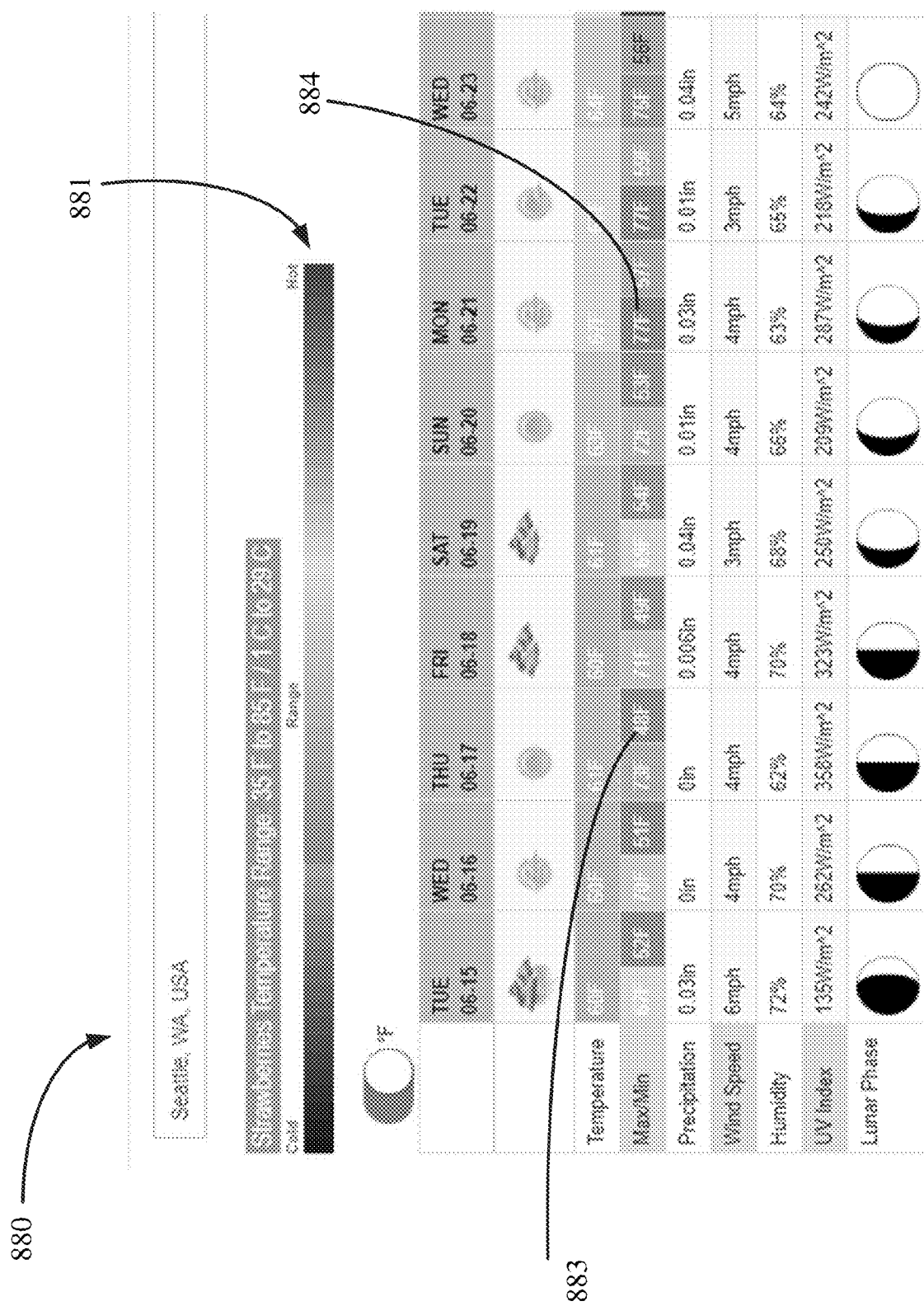
FIG. 8B is an embodiment of a graphical output showing identified anomalies.

FIG. 8B is an embodiment of a graphical output 880 (which may be referred-to in this example as a "chart") showing identified anomalies. This embodiment shows several items of environmental data relating to a strawberry crop in a specifically geographic region—Seattle Washington, USA. Specifically, the chart 880 in FIG. 8B reports date for temperature, precipitation, wind speed, humidity, UV index, and lunar phase over a period of nine days (Tuesday, June 15-Wednesday, June 23) for a given year. In some embodiments, that environmental data is historical environmental data, and in some embodiments, that data is predicted environmental, and in some embodiments that environmental data includes some historical environmental data and some predicted environmental data.

The chart 880 is a graphical display not because it is a table of test, but because the chart 880 communicates anomalies by graphically (in this example, by color) distinguishing the anomaly data from other data in the chart 880. For example, the temperature bar 881 is a reference key showing temperatures by color, where temperatures that are colder than desirable, normal, or expected for strawberries (i.e., for a time of year, time of season, for the phenological phase to which the environmental data relates) is shown in increasingly darker shades of blue (darker as the temperatures get colder, on the left end of the temperature bar 881), and where temperatures that are warmer than desirable, normal or expected for strawberries (i.e., for a time of year, time of season, for the phenological phase to which the environmental data relates) is shown in increasingly darker shades of red (darker as the temperatures get warmer, on the right end of the temperature bar 881).

In some embodiments, the data in the chart 880 graphically provides a quantitative indication of each anomaly through assigning to each anomaly a darker or lighter shade of blue or red (corresponding to the temperature bar), depending on the deviation of the anomaly from its desirable, normal or expected value.

For example, the minimum temperature 883 on Thursday, June 17 ("THU 06-17", 48 degrees Fahrenheit) is graphically identified as an anomaly because it is graphically displayed against a blue background, which graphically communicates to a user that the temperature is cooler than desirable, normal or expected. The text ("48F") expressly reports the temperature, but without more (e.g., without the background color) that text does by itself indicate an anomaly, and does not indicate the quantitative severity of the anomaly. The shade of that blue is fairly light, as determined by comparison of that shade to the temperature bar 881, and so indicates that the anomaly is quantifiably less anomalous that would be an anomaly displayed in a darker shade of blue (e.g., further to the left on the temperature bar 881).

As another example, the maximum temperature 884 on Monday, June 21 ("06-21", 77 degrees Fahrenheit) is graphically identified as an anomaly because it is graphically displayed against an orange, or reddish-orange) background, which graphically communicates to a user that the temperature is cooler than desirable, normal or expected. The text ("77F") expressly reports the temperature, but without more (e.g., without the background color) that text does by itself indicate an anomaly, and does not indicate the quantitative severity of the anomaly. The shade of that re (or reddish-orange) blue is fairly light, as determined by comparison of that shade to the temperature bar 881, and so indicates that the anomaly is quantifiably less anomalous that would be an anomaly displayed in a darker shade of red (e.g., further to the right on the temperature bar 881).

A graphical output 880 may be provided to a user in one or more of a variety of ways, including without limitation showing the graphical output 880 on a computer display screen as part of a graphical user interface, and/or including the graphical output 880 in a message (e.g., email or sms) to the user.

Figure 9:
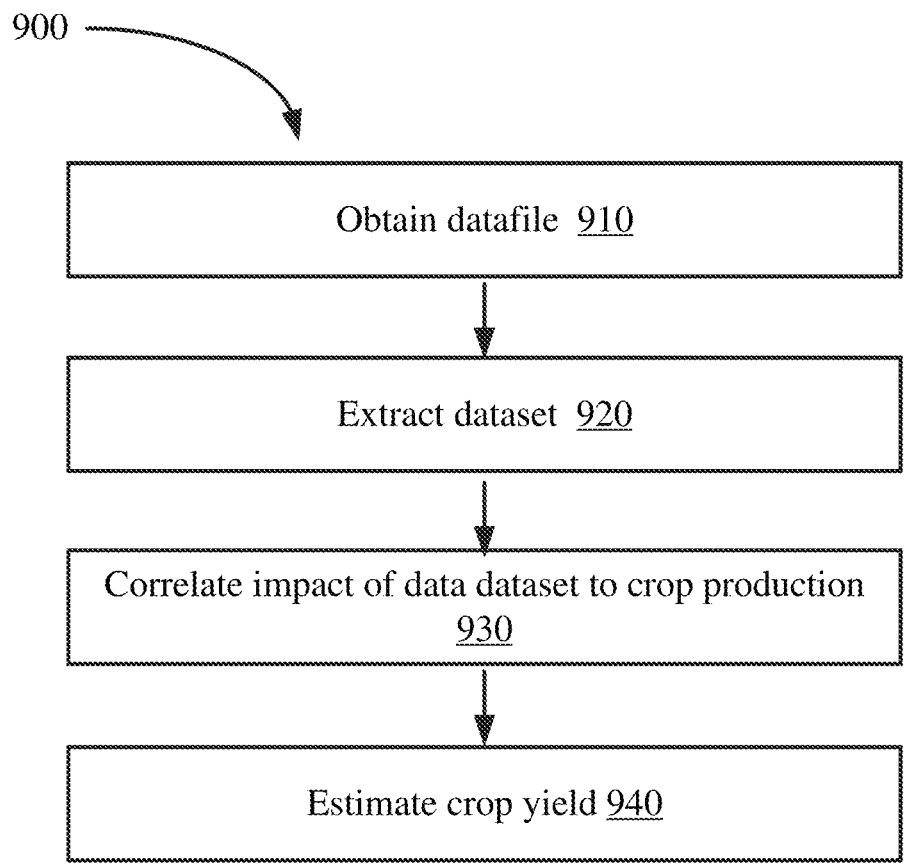
FIG. 9 is a flowchart of an embodiment of a method for estimating crop production from a source.

FIG. 9 is a flowchart of an embodiment of a method 900 for objectively estimating quantity of crop production (or a change to a previously-expected quantity of crop production) from a grower of an agricultural products.

At step 910, the method 900 receives a set of datafiles, as described herein. Each such received datafile includes a set of data items that include quantitative data describing factors that are known to impact crop production.

Then, at step 920, for each received datafile the method extracts the dataset (the "initial dataset") from the datafile. In some embodiments, step 920 also translates the initial dataset into a uniform data format so that the transformed initial dataset has a data format that is uniform with other such received and processed datasets.

At step 930, the method correlates the received dataset (i.e., either the initial dataset, or the transformed initial dataset) to crop production. Illustrative embodiments produce an estimate of change in a previously-expected crop yield.

One such embodiment of the APExS module 270 produces an estimate of increased or decreased expectation of crop yield by correlating input data to scientific data held in the APExS module 270. In illustrative embodiments, the correlations depend on both the input data and the phenological phase to which the data applies. In some embodiments, a prediction of weather generated during a given phenological phase may not apply to that phase, but may instead apply to a phenological future phase—i.e., a future phenological phase that will be the current phase at the future time.

Some examples are below, for temperature and humidity input at different phenological phases. Some phenological phases are more temperature sensitive; other phases are more humidity sensitive. The APExS system can also use the same factors to predict quality of agricultural product, such as the grade of an agricultural product.

In each of the following examples, a positive percentage predicts a corresponding increase in expected crop yield, for example relative to a previous or baseline prediction. A negative percentage predicts a corresponding decrease in expected crop yield, for example relative to the previous or baseline prediction.

Example A—Impact on crop yield for temperature and humidity predicted for the stem elongation phase of a crop from a specified geographic location (Phase 3).

| Humidity 95% | −3% | −1% | +1% | +3% | +5% | +6% |
|---|---|---|---|---|---|---|
| Humidity 85% | −4% | −2% | +0% | +2% | +4% | +5% |
| Humidity 75% | −4% | −2% | +0% | +2% | +4% | +5% |
| Humidity 65% | −5% | −2% | +0% | +2% | +5% | +6% |
| | 50° F. | 55° F. | 60° F. | 65° F. | 70° F. | 75° F. |

Example B—Impact on crop yield for temperature and humidity predicted for the ripening or maturity of fruit and seed phase from a specified geographic location (Phase 8)

| Humidity 95% | +5% | +6% | +6% | +6% | +6% | +6% |
|---|---|---|---|---|---|---|
| Humidity 85% | +2% | +3% | +4 | +5 | +4 | +4 |
| Humidity 75% | +0% | +1% | +2% | +3% | +2% | +2% |
| Humidity 65% | −2% | −1% | +0% | +1% | +0% | +0% |
| | 50° F. | 55° F. | 60° F. | 65° F. | 70° F. | 75° F. |

In short, the APExS module 270 accepts actual records of temperature and humidity for a given time, or a prediction of temperature and humidity for a given time, and applies those as input for the phenological phase that the crop is in or will be at the given time. In some embodiments, the APExS module 270 then performs a lookup using the tables above. For example, if temperature is (or is predicted to be) 70° F. and the humidity is predicted to be 85% when the crop is in the ripening or maturity of fruit and seed phase, the APExS module 270 will report that crop yield can be expected to be 4% higher than a previous, or baseline, expectation.

This information may be valuable to a farmer, for example, since it may help the farmer know when to apply chemicals (e.g., fertilizer), and/or whether to advance or delay harvest. This information may be valuable to wholesalers and shippers, for example, in that it may help them to know what volume of product to expect, and when.

In practice, the APExS module 270 uses input vectors having more than just temperature and humidity, so the system will have correlation tables like those above, but in many more dimensions.

Statistical Model Embodiment

Some embodiments of the APExS module 270 include a cognitive process based on one or more statistical models, such as models developed with AI, ML, industry experience (ex: assumptions, correlations, etc.). It relies upon standard regression techniques to analyze and model data. For the variables affecting the supply chain that are known to be more stable, a linear regression technique, such as linear square fit estimation modeling, for one or multiple variables is used. The output of the APExS module 270 helps the system 200 provide customized and high-fidelity data analysis, recommendations, and alerts to users.

Artificial Intelligence and Machine Learning Embodiment

Some embodiments of the APExS module 270 include a cognitive process developed with artificial intelligence ("AI") and machine learning ("ML"). To that end, some embodiments include a neural network for example.

Using a trained neural network for estimating quantity of crop production (or a change to a previously-expected quantity of crop production) improves performance of the system in that the neural network can evaluate the data quickly and efficiently, and produce an objective estimate, which is an improvement over estimates made by humans using information systems in the past, which estimates are always subjective.

To update an estimate of production of the agricultural product, some embodiments include a set of estimating neural networks. Each estimating neural network in the set of estimating neural networks is trained to assess datasets from the grower and to predict whether the dataset indicates an increase in the production estimate, a decrease in the production estimate, or that the production estimate will stay the same.

Such a neural network is trained using a plurality of training datasets, each of which has a plurality of data items, and a corresponding results vector. In illustrative embodiments, the neural network, prior to training, is unweighted (or blank) in that the weights between the nodes are all equal. In illustrative embodiments, the neural network, once trained, is static in that it does not change or evolve when used. In other embodiments, the neural network may continue to learn and evolve with use.

Each training dataset includes a plurality of training data items, and the corresponding results vector indicates one of a prediction that the production estimate will increase, a prediction that the production estimate will decrease, or a prediction that the production estimate will stay the same.

Examples of such a training set are provided in Table 9A and Table 9B. These training sets include quantitative data for temperature, humidity and hours of daylight over a series of five days. In practice, such a training set will have data for most, and in some embodiments all, days of the growing season for the agricultural products, or at least all days of a phenological phase.

The result vector of Table 9A and indicates that the factors of Table 9A will increase the production estimate by 2% (i.e., +2%).

TABLE 9A

| Day | Temp | Humidity | Daylight | Result Vector |
|---|---|---|---|---|
| 0 | 25° C. | 60% | 10:00 | +2% |
| 1 | 26° C. | 58% | 10:05 | |
| 2 | 24° C. | 59% | 10:10 | |
| 3 | 25° C. | 63% | 10:15 | |
| 4 | 25° C. | 68% | 10:20 | |

The result vector of Table 9B indicates that the factors of Table 9B will decrease the production estimate by 1% (i.e., −1%).

TABLE 9B

| Day | Temp | Humidity | Daylight | Result Vector |
|---|---|---|---|---|
| 0 | 20° C. | 50% | 10:00 | −1% |
| 1 | 19° C. | 48% | 10:05 | |
| 2 | 21° C. | 49% | 10:10 | |
| 3 | 24° C. | 53% | 10:15 | |
| 4 | 25° C. | 58% | 10:20 | |

Training the neural network includes applying to the neural network a plurality (or group) of training sets. In illustrative embodiments, training a neural network on a one-variable model (e.g., one of temperature, humidity, or daylight) may include providing to the neural network 4500 distinct training datasets, but the number of distinct training datasets to produce train the neural network will depend on the purpose and user requirements for which the neural network is being trained. Consequently, training a neural network may include providing to the neural network with more than 4500 distinct training datasets, or fewer than 4500 distinct training sets, depending on the datasets and the accuracy required for the application of the neural network.

In an illustrative embodiment, the group of training datasets (e.g., 4500 training datasets in keeping with the foregoing example) represent data gathered over a span of several years for a specific crop at a specific geographic location over that span of years. For example, in an illustrative embodiment, the set of training datasets represent data for e.g., strawberries in Salinas Washington, USA over ten years or ten growing seasons.

In some embodiments, training of the neural network is performed in batches. For example, training on 4500 training datasets may be performed by applying to the neural network 9 batches of 500 training datasets each, where the batches are applied in series to one another. For example, in some embodiments (e.g., depending on the complexity and/or the objective context of the output), a training model may divide the group of training datasets into smaller groups (each such group may be referred-to as a "batch"), each batch providing a variable training model improving the combinations yielded that will be fed into the overall training model. For example, the inventors have discovered that one run of 4500 training datasets as one large group does not produce the same trained neural network as running batches comprised of sub-sets of the 4500 training datasets, such as 9 batches of 500 distinct training datasets each. In some embodiments, the group of training datasets of agricultural data may be subdivided into batches based on corresponding different phases of a crop's growing season. For example, some embodiments may divide the training datasets into batches of (1) training datasets corresponding to the start of the growing season for that crop, and (2) training datasets corresponding to the middle or peak of the growing season for that crop, and (3) training datasets corresponding to the end of the growing season for that crop. In illustrative embodiments, the training dataset comprise agricultural data gathered for each such phase of the growing season of a geographic location over several years. Some embodiments may further divide the training datasets of each batch into smaller batches (e.g., 500 training datasets each).

Some embodiments train the neural network over several consecutive epochs. In illustrative embodiments, each epoch uses the same training data as the other epochs. In keeping with the foregoing example, each epoch may include 9 batches of 500 training datasets each. An illustrative embodiment trains the neural network by applying 15 epochs. Each epoch prior to the final epoch trains the neural network to an intermediate-trained state, and each subsequent epoch begins with the neural network in the intermediate-trained state produced at the end of the previous epoch. Ultimately the final epoch produces concludes the training of the neural network.

In illustrative embodiments having more than one variable (e.g., two or more of temperature, humidity, and daylight) typically include even more training sets and/or more epochs. The inventors have found that the number of training sets used to train the neural network goes up exponentially with the number of variables, as compared to training the neural network on a single variable. The number of training sets, and/or batches and/or epochs, can be determined by the system designer or neural network training person and may depend on one or more of the datasets and the accuracy required for the application of the neural network.

After training, the neural network is tested by applying one or more test datasets and assessing whether the trained neural network correctly predicts a change in a production estimate. The assessment of whether the trained neural network correctly predicts a change in a production estimate will depend on purpose and user requirements for which the neural network is being trained, and such an assessment can be made by the system's designer and implementor. If the trained neural network correctly predicts a change in a production estimate, then the training is complete, and otherwise the neural network undergoes additional training, with additional training datasets, until the neural network correctly predicts a change in the production estimate.

Both the training datasets, and test datasets, may include actual historical data.

At step 940, the method 900 estimates crop yield. In illustrative embodiments, step 940 includes multiplying a previously-expected (or previously estimated) crop yield of crop yield by an estimate of change in previously-expected crop yield as determined by any of the foregoing methods.

Content Mining Module 260

Some embodiments of the supply chain intelligence system 200 also include a content mining module 260. The content mining module 260 relies on a TRIZ model to identify variables that affect the food supply chain. This TRIZ-based analysis is scalable to other industries and specifically other specialty industries that may trade in volatile commodities, like seafood and oil and gas. The content mining module 260 mines data text using keywords from all sources, including the clean repository (discussed above) and the APExS module 270 alongside the external data sources that feed the ingestion module 210. The content mining module 260 mines for correlations in the data and patterns based on the identified key variables.

Alert Notification Module 240

The next stack module in the supply chain intelligence system 200 is the alert notification module 240 that predicts events and makes recommendations based on the AI/ML analysis and/or the output of the APExS module 270 and content mining module 260. Based on this data analysis, the supply chain intelligence system 200 outputs various alerts, notifications, recommendations, etc. to users 180, both based on the learned user behavior and the user profile. Triggering events, variables that reach thresholds or match certain criteria, or the like are output and can be customized for the users 180. The notifications can be output manually, automatically according to a schedule, in real-time, some combinations of these options, or in any other manner consistent with the user's needs to help support the user's processes, activities, and financial decisions.

Content Delivery Module 250

The next stack in the supply chain intelligence system 200 is the content delivery module 250 that helps output relevant content in context for each user on the commodities of interest. The content delivery module 250 reads from the alert notification module 240 to deliver intelligent content via multiple delivery modalities such as email, sms, social media, and web applications, to name but a few examples. The dynamic content can be customized based on the users' needs such as by phenological phase, season, the commodities of interest, the geographic regions of interest, and localized content such as weather, and events, to name but a few examples. The customized user profile and tracked behavior data is overlaid on the content received from the alert notification module 240, APExS module 270, ingestion module 210, or any other module in the supply chain intelligence system 200 to provide the user with the dynamic content needed to support their needs.

Visualization Module 230

The supply chain intelligence system 200 also includes a visualization module 230 that displays the data science and analytics discussed above in a format that fits the needs, desires, or specification of a user 180. The visualization module 230 is focused on a user "data experience" so, in preferred embodiments, it is customized to the manner in which the users experience the data that is most helpful to them. This incorporates many human factors considerations to make the data digestible, relevant, and timed appropriately for each user. Options include user category tabs that give more data relevant to the user based on the user's category in addition to the user's profile and tracked behaviors, analyzers and tools for further calculations (ex: freight analyzer or transport calculator that pulls in real-time data but is not continuously displayed), scorecards on various variables, features, commodities, or other data.

One-Click

Some embodiments of the visualization module 230 implement a "one-click" function that allows a user 180 to cause the supply chain intelligence system 200 to cause display of output data in a customized format previously customized by the user 180. The "one-click" functionality is an improvement over other GUI formats because its saves labor on the part of the user 180 (i.e., the user does not have to navigate through one or more menus each time the user wants to build the user's desired display screen), and causes display of output data more quickly than could be provided if the user 180 had to navigate through one or more menus each time the user wants to build the user's desired display screen.

To implement the "one-click" function, the supply chain intelligence system 200 gathers and stores the following information from a client: What dataset does the client want to access (e.g., strawberries); What time range does the client want displayed; Other user-specified details ("filters") about the product in question (e.g., region of product origin; variety of product; etc.)

Then, with a single mouse click (or a single instance of some other computer action, such as a specified key stroke; a tap on a touch screen; a gesture such as in a VR environment; a verbal command to voice recognition software, etc.), the supply chain intelligence system 200 reads the stored client information; retrieves the data required to generate the client's specified display, and generates; and causes the display (e.g., on a computer display screen) a graphical output accordingly.

Figure 4:
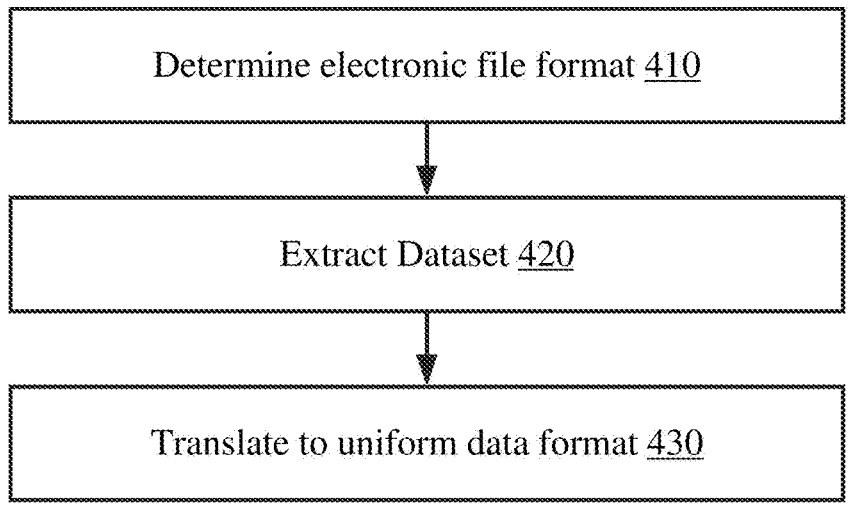
FIG. 4 is a flowchart of an embodiment of a method of extracting data.

FIG. 4 is a flowchart of an embodiment of a method 400 of extracting data from a received datafile 190.

At step 410, the system 200 determines the electronic file format of the received datafile 190. In some embodiments, the system 200 determines the electronic file format of the received datafile 190 by assessing metadata in the received datafile 190, and in some embodiments the system 200 determines the electronic file format of the received datafile 190 by assessing the file extension of the datafile 190 (e.g., ".pdf," ".exe," ".doc," etc.)

Some embodiments scrape data from a data source 170 and store the data obtained by the scraping in a pre-defined (e.g., uniform) format. In such embodiments, the method 400 may omit step 410 for files in the pre-defined format.

At step 420, the system 200 extracts the dataset 192 from the datafile 190. In illustrative embodiments, extracting the dataset includes copying each data item 193 of the dataset 192 to a memory 280, which may be a volatile memory or a non-volatile memory, or which may include both a volatile memory and a non-volatile memory.

At step 430, the system 200 translates (or formats) the extracted data into a uniform data format. In illustrative embodiments, all data extracted from all datafiles is formatted into the same uniform data format.

Figure 5:
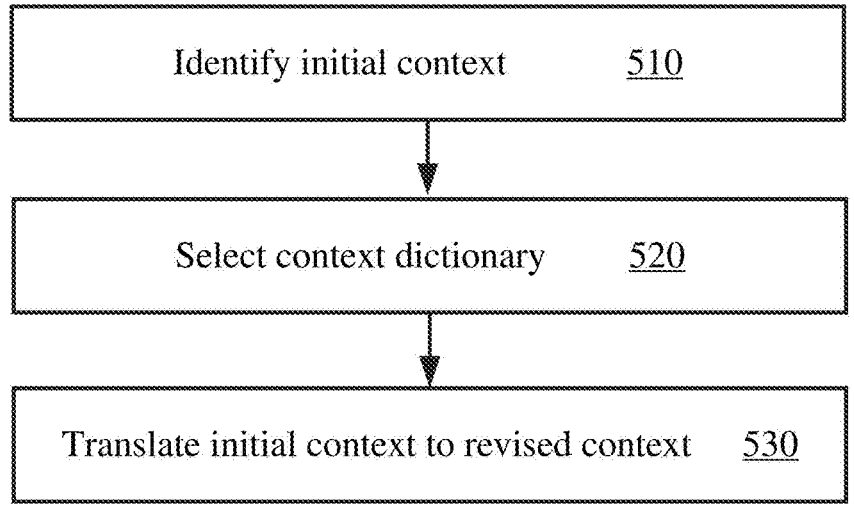
FIG. 5 is a flowchart of an embodiment of a method of contextualizing data.

FIG. 5 is a flowchart of an embodiment of a method 500 of contextualizing data.

At step 510, the system 200 identifies the initial context of a dataset 192. In some embodiments, the system 200 identifies the initial context of a dataset 192 by evaluating the datafile 190 of the dataset 192. In some embodiments the system 200 may know (e.g., may have a record of) the source 170 of a datafile 190, and may determine the initial context of the dataset within that datafile 190 based on that source 170. For example, the source 170 may be in a known geographic location or known geographic region, and the system 200 may know that the geographic region expresses data (e.g., agricultural data) in known units (e.g., in metric units; or in cartons; or in dozens, etc.).

In other embodiments, the datafile 190 may include signature data 191 that identifies the context of its dataset 192.

In other embodiments, the system 200 may access the dataset 192 with the datafile 190 and identify (e.g., search-for) units of measure.

At step 520, the system 200 selects a context dictionary. In some embodiments, the context dictionary includes translations from a set of quantitative units of the initial context to a set of quantitative units of a revised context. For example, if the initial context specifies a quantity of products in kilograms, and revised context is specified specifying quantity in pounds, the selected context dictionary would be a context dictionary that includes metric units correlated to imperial units. In some embodiments, the context dictionary includes a translation from a qualitative unit of the initial context (e.g., product name in one language) to a qualitative unit of a revised context (e.g., product name in a different language).

At step 530, the system 200 translates each data item in the dataset 192 to a revised format to produce a revised data item. For example, if a quantity of product is specified in kilograms, step 530 translates that data item to produce a revised data item specified pounds by dividing the weight of product by 2.2 (i.e., 2.2 pounds=1 kilogram). If the data item includes a corresponding indicator of its unit of measure (for example, "kg" or "kilograms), then step 520 may include deleting that unit of measure and/or replacing it with a revised unit of measure (in keeping with the foregoing example, replace "kg" or "kilograms" with "lbs" or "pounds").

Anti-Duplication

Some embodiment of the supply chain intelligence system 200 include an anti-duplication system that improves data accuracy and precision and maintains data integrity, by avoiding duplicates of data in the system and in the processing of that data. The anti-duplication system may be part of the data ingestion module 210.

The anti-duplication system is especially useful for data ingested from public sources without APIs. In some embodiments, the chain intelligence system 200 also allows data to be audited and corrected when a source 170 updates a previously received dataset in real time.

For example, some sources, such as some government sources or Blue Book, update and correct data weeks or sometimes months after the data is originally posted, particularly in certain data categories like volume and movement of commodities. Illustrative embodiments identify when such a source updates or corrects the data, so its user can rely on the most accurate data available in making real-time financial decisions.

The supply chain intelligence system 200 recognizes that both reports concern the same shipment of strawberries, not two separate shipments of strawberries. In other words, the supply chain intelligence system 200 recognizes that only one shipment of 20 tons of strawberries arrived at Nogales from that farmer, not two shipments of 20 tons each. This is desirable to avoid double-counting the amount of agricultural product (in this case, strawberries) in transit.

In some embodiments, the supply chain intelligence system 200 recognizes that two datafiles report the same data (i.e., they are duplicates of one another) by comparing each downloaded dataset to every other dataset stored in the records of the supply chain intelligence system 200. In some embodiments, such comparison is done by directly comparing the dataset in each acquired datafile (which may be referred to as a "target" dataset) to the dataset in every other datafile in the records (e.g., memory of database) of the supply chain intelligence system 200.

If the comparison shows that a target dataset is not identical to any of the other datasets of datafiles in the records, then the target dataset is hashed, and the target dataset and its hash are stored in the records of the supply chain intelligence system 200. Otherwise, the target dataset it discarded.

Figure 6:
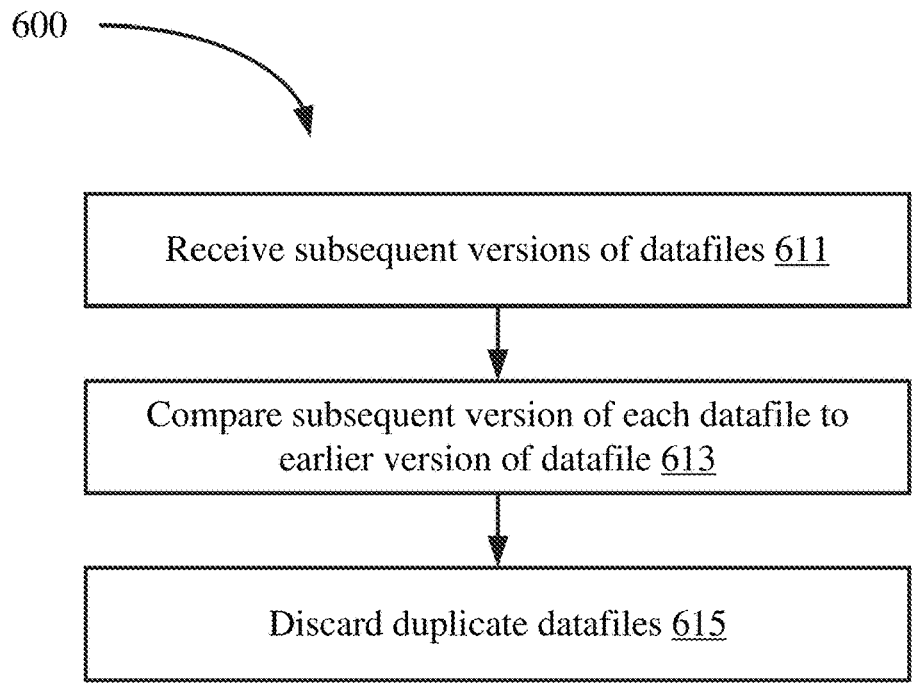
FIG. 6 is a flowchart of an embodiment of a method of de-duplicating data.

FIG. 6 is a flowchart that illustrates an embodiment of an anti-duplication process 600.

Step 611 includes receiving a subsequent datafile after receiving previous datafiles (the previously-received datafiles), such that one or more of the received datafiles may be subsequent versions of a previously-received datafile.

Step 613 includes comparing each such subsequent datafile to an earlier datafile (or in some embodiments, to each previously-received datafile) to determine whether the subsequent datafile is a duplicate of a previously-received datafile. Some embodiments compare the subsequent datafile to an earlier datafile by creating a hash of the previously-received datafile and creating a hash of the subsequent datafile, and comparing the hash of the previously-received datafile to the hash of the subsequent datafile. In a situation in which the hash of the previously-received datafile is identical to the hash of the subsequent datafile, then the subsequent datafile is a duplicate of the previously-received datafile. In contrast, in a situation in which the hash of the previously-received datafile is not identical to the hash of the subsequent datafile, then the subsequent datafile is not a duplicate of the previously-received datafile.

In other embodiments, the subsequent datafile includes signature data, and the previously-received datafile includes signature data. Such embodiments may compare the signature data of each subsequent datafile to the signature date of an earlier datafile. In a situation in which the signature data of the previously-received datafile is identical to the signature data of the subsequent datafile, then the subsequent datafile is a duplicate of the previously-received datafile. In contrast, in a situation in which the signature data of the previously-received datafile is not identical to the signature data of the subsequent datafile, then the subsequent datafile is not a duplicate of the previously-received datafile.

Yet other embodiments may compare each data item in the subsequent datafile to a corresponding data item in the previously-received datafile. Such a comparison may be performed after transforming the dataset of the subsequent datafile and the dataset of the previously-received datafile into a uniform data format. In a situation in which each data item in the previously-received datafile is identical to a corresponding data item of the subsequent datafile, then the subsequent datafile is a duplicate of the previously-received datafile. In contrast, in a situation in which each data item in the previously-received datafile is not identical to a corresponding data item of the subsequent datafile, then the subsequent datafile is not a duplicate of the previously-received datafile.

Step 615 includes discarding each subsequent datafile that is determined to be a duplicate of an earlier datafile.

Data Update Via Subsequently-Received Datasets

As described herein, the supply chain intelligence system 200 acquires datasets from many sources 170. A typical dataset includes several data items reporting information about an agricultural product (e.g., name of product; quantity of product; size of shipping unit; weight; identification of the source of the agricultural product; date of the dataset, etc.).

The supply chain intelligence system 200 incorporates the datasets into its records (e.g., common dataset 195), and uses the data to produce outputs to consumer 180.

Sometimes a source 170 updates a dataset (e.g., an old dataset) some time (and perhaps a long time) after the source first made the dataset available. In some embodiments, the supply chain intelligence system 200 is able to (i) determine when such an old dataset has changed, and (ii) identify which datum within the old dataset has changed, so that the supply chain intelligence system 200 can update common dataset 195. Updating the common dataset enables the system to provide updated and correct data to a user subsequent to the update.

To accomplish those goals, the supply chain intelligence system 200 repeatedly downloads each dataset (i.e., the same dataset from the same source 170 over and over again), and stores each such downloaded dataset. Each such new download is then compared against a previous download of that dataset to determine whether anything has changed. Specifically, each data item in the new download is directly compared to its counterpart data item in a previous download. When a data item from the newly downloaded dataset does not match its counterpart data item in the previously-downloaded dataset, that data item is flagged as having changed (or as having been updated).

Dataset Update Example

A source 170 of a dataset about strawberries releases the dataset on Mar. 1, 2020. The supply chain intelligence system 200 downloads that Mar. 1, 2020 dataset. That Mar. 1, 2020 dataset reports that the source 170 shipped 20 tons of strawberries on Feb. 29, 2020. The supply chain intelligence system 200 subsequently downloads that Mar. 1, 2020 dataset from the source 170 every day (or every hour; or every 10 minutes; or every minute, to name but a few examples). In this way, supply chain intelligence system 200 builds a large library of the Mar. 1, 2020 datasets. If the data in the Mar. 1, 2020 dataset never changes, then each download of the Mar. 1, 2020 dataset will be identical to all other downloads of the Mar. 1, 2020 dataset.

Later, on Jul. 1, 2020, the source 170 corrects the Mar. 1, 2020 dataset. The corrected Mar. 1, 2020 dataset is not a new dataset (presumably the source also releases a new dataset on Jul. 1, 2020, but that new dataset reports new data, while the corrected Mar. 1, 2020 dataset is simply a correction of the dataset that the source released on Mar. 1, 2020). The corrected Mar. 1, 2020 dataset reports that the source shipped only 10 tons of strawberries on Feb. 29, 2020.

The supply chain intelligence system 200 downloads the (now corrected) Mar. 1, 2020 dataset on Jul. 1, 2020. The supply chain intelligence system 200 is unaware that the Jul. 1, 2020 download of the Mar. 1, 2020 dataset has changed relative to previous downloads. However, the supply chain intelligence system 200 compares the Jul. 1, 2020 download of the Mar. 1, 2020 dataset to a previous download of the Mar. 1, 2020 dataset (or compares the Jul. 1, 2020 download of the Mar. 1, 2020 dataset to all previous downloads of that Mar. 1, 2020 dataset). That comparison will indicate that the Mar. 1, 2020 dataset has changed. Because each datum in the Jul. 1, 2020 download of the Mar. 1, 2020 dataset is compared to its counterpart datum in a previous download of the Mar. 1, 2020 dataset, the comparison will discover that the source has changed "20 tons" to "10 tons."

The supply chain intelligence system 200 then updates its common dataset 195 by changing "20 tons of strawberries shipped by the source on Feb. 29, 2020" to "10 tons of strawberries shipped by the source on Feb. 29, 2020."

In addition, the process described above, supply chain intelligence system 200 also computes and stores a hash of each download of a dataset, including the first download (the original download), and each subsequent download of that dataset. If any datum within the dataset has changed since the original download, the hash of the subsequent download will be different than the hash of the original download.

Continuing with the previous example, supply chain intelligence system 200 computes and stores a hash of the Mar. 1, 2020 dataset when it first downloads the Mar. 1, 2020 dataset, and also computes a hash of the Mar. 1, 2020 dataset each time that it downloads the dataset again, including the Jul. 1, 2020 download of the Mar. 1, 2020 dataset. If any data item within the Mar. 1, 2020 dataset has changed since the original download, the hash for the Jul. 1, 2020 download of the Mar. 1, 2020 dataset will be different than the hash of the original download of the Mar. 1, 2020 dataset. Such a change in the hash will indicate that at least one data item in the Mar. 1, 2020 dataset has changed, but will not indicate which data item in the Mar. 1, 2020 dataset was changed in the Jul. 1, 2020 corrected dataset.

The supply chain intelligence system 200 can monitor the hash of each such download to quickly determine when a new download of a previous (and previously-downloaded) dataset includes at least one data item that needs to be identified and corrected in the supply chain intelligence system 200 database.

Figure 7:
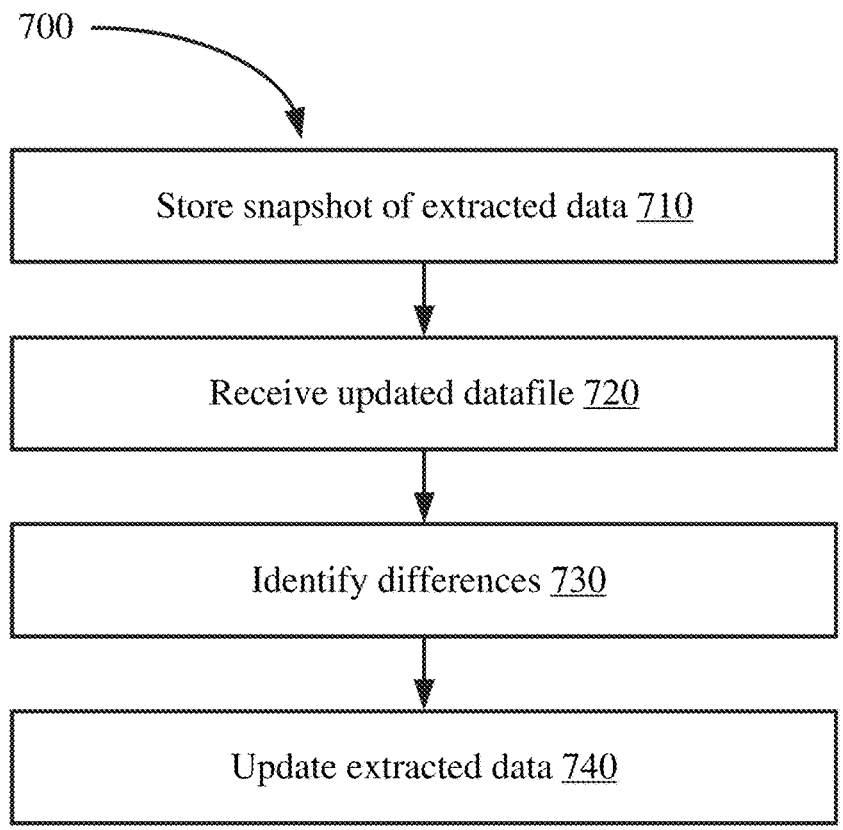
FIG. 7 is a flowchart of an embodiment of a method of updating data.

FIG. 7 is a flowchart that illustrates an embodiment of a data update process 700.

At step 710, the method 700 stores a snapshot of a dataset 192 previously-extracted from a datafile 190. Illustrative embodiments store the snapshot in a different location in memory (e.g., in a memory 180) than the previously-extracted dataset 192. Such storage allows the system to work with the snapshot without risk of corrupting the dataset 192, and without denying other parts of the system 200 to access to the previously-extracted data. Some embodiments also store a hash of the dataset 192 previously-extracted from a datafile 190.

At step 720, the system 200 receives an updated datafile 190. The updated dataset 192 includes a plurality of data items 193, each of which corresponds to a corresponding data item 193 in the previously-extracted dataset 192.

At step 730, the method identifies data items in the dataset 192 of the updated datafile 190 that do not match their counterpart data items in the snapshot. In illustrative embodiments, the system 200 accesses each data item 193 in the snapshot, and for each such data item 193, the system compares that data item 193 to its corresponding data item 193 in the updated dataset 192.

At step 740, the system updates previously-extracted dataset 192 with the data items in the dataset 192 of the updated datafile 190 that do not match their counterpart data items in the snapshot. In illustrative embodiments, each item in the dataset 192 of the updated datafile 190 that does not match its counterpart data item in the snapshot is written to the previously-extracted dataset 192 to replace or over-write its counterpart data item in the previously-extracted dataset 192.

Anomaly Detection

Some embodiments identify anomalies within a received dataset 192. Such anomalies can inform a supply-chain participant, or other user, about potential disruptions or other changes to the supply and/or operation of the supply chain.

In one embodiment, each data item 193 in a received dataset 192 is compared against a corresponding data item having an expected value and a corresponding allowable range. Any data item that falls outside of the corresponding allowable range is an anomaly.

For example, a received dataset 193 is presented in Table 8A, with three data items 193 (Temperature, Humidity, and Daylight) for each of five days (Day 0; Day 1; Day 2; Day 3; Day 4; and Day 5).

A standard dataset is presented in Table 8B, and includes several data items, and specifically includes a data item corresponding to each data item 193 in the received dataset 192 of Table 8A. Each data item in the standard dataset includes an expected value and a range. For example, the temperature for each day is 25° C. with a range of ±2° C. (for a range of 23° C. to 27° C.).

Comparing each data item 193 in the received dataset 192 (Table 8A) to its corresponding data item in the standard dataset (Table 8B) reveals that the temperature on Day 2 (19° C.) is an anomaly because it falls outside the range (23° C. to 27° C.) of its corresponding standard (25±2° C.). Similarly, the humidity on Day 1 (50%) is an anomaly because it falls outside the range (55%-65%) of its corresponding standard (60%±5%), and the humidity on Day 2 (54%) is an anomaly because it falls outside the range (55%-65%) of its corresponding standard (60%±5%).

As a result of the comparison, the process identifies temperature on Day 2, the humidity on Day 1, and the humidity on Day 2 as anomalies.

TABLE 8A

| Day | Temp | Humidity | Daylight |
| --- | --- | --- | --- |
| 0 | 25° C. | 60% | 10:00 |
| 1 | 26° C. | 50% | 10:05 |
| 2 | 19° C. | 54% | 10:10 |
| 3 | 25° C. | 63% | 10:15 |
| 4 | 25° C. | 68% | 10:20 |

TABLE 8B

| Day | Temp ° C. | Humidity | Daylight |
| --- | --- | --- | --- |
| 0 | 25 ± 2° C. | 60% ± 5% | 10:00 |
| 1 | 25 ± 2° C. | 60% ± 5% | 10:05 |
| 2 | 25 ± 2° C. | 60% ± 5% | 10:10 |
| 3 | 25 ± 2° C. | 60% ± 5% | 10:15 |
| 4 | 25 ± 2° C. | 60% ± 5% | 10:20 |

FIG. 8A is a flowchart of an embodiment of a method of detecting an anomaly in a dataset 192. Step 810 includes receiving, at a computer system, a plurality of datafiles 190 from a plurality of remote sources 170. The plurality of datafiles may be referred-to as received datafiles. Each received datafile 190 of the received datafiles contains an initial dataset 192 from a corresponding one of the remote sources, and has a corresponding electronic file format.

The dataset 192 (which may be referred-to as the received dataset) includes a plurality of data items 193. In some embodiments, each data item 193 includes quantitative and/or qualitative data relating to an agricultural product. Qualitative data may be, for example, a name of an agricultural product (e.g., apples; oranges; etc.) In preferred embodiments, the extracted dataset is formatted or reformatted into a uniform data format.

For quantitative data items in a dataset 192, each data item has an expected quantitative range (e.g., for a specified agricultural attribute), and an anomaly comprises or includes a data item having a quantitative value that is outside of its expected quantitative range. A quantitative value that is outside of its expected range may be greater than the high end of its expected range, or lower than the low end of its expected range. For example, if an agricultural attribute is temperature having a range of 25±2° C. (i.e., a range of 23° C. to 27° C.), a data item reporting a temperature of 21° C. would be outside the expected range because it is lower than the low end (23° C.) of the expected range, and a data item reporting a temperature of 28° C. would be outside the expected range because it is greater than the high end (27° C.) of the expected range.

In some embodiments, receiving a dataset 192 includes obtaining a dataset 192 from the common dataset 195. Such embodiments do not include extracting the data as described above since that data has already been extracted and stored in the common dataset 195.

Then for each datafile 190, step 820 extracts the dataset 192 from the datafile 190. The extracted dataset may be referred-to as the initial dataset. In some embodiments, step 820 also includes translating the initial dataset into a uniform data format to produce an initial translated dataset. In some embodiments, step 820 also includes storing the initial dataset or the initial translated dataset to a computer memory, such as data repository 290, as part of a common dataset 195.

Step 830 includes receiving a standard dataset (or "expected" dataset), an example of which is in Table 8B. The standard dataset includes a plurality of data items, wherein each of data items corresponds to a corresponding data item in the initial dataset 192 (or the initial translated dataset).

At step 840, the method evaluates (e.g., using the one or more processors), the initial dataset (or the initial translated dataset) to identify one or more anomalies. Each anomaly identified may be referred-to as an identified anomaly. Collectively, all such identified anomalies form a set of identified anomalies.

In some embodiments, step 840 compares each data item 193 in the initial dataset 192 (or the initial translated dataset) to its corresponding data item from the standard dataset to determine whether each such data item 193 in the received dataset 192 (or the initial translated dataset) is within the corresponding expected range. Each data item 193 in the received dataset 192 (or the initial translated dataset) that is not within the corresponding expected range is identified as an anomaly.

Step 850 produces an anomaly set including each identified anomaly (i.e., the set of identified anomalies).

Step 860 outputs the anomaly set to a user. For example, in some embodiments, step 860 causes display of the anomaly set on a display device. Some embodiments tailor the display of the anomaly set to specified desires of a user or client.

For example, some embodiments access a user profile that identifies at least one agricultural attribute, which agriculture attribute may be specified in the user profile by the user. To illustrate: in some embodiments, the agriculture attribute is temperature at the grower on a given date; or average temperature at the grower over a specified date range, or average temperature at the grower during a specified phenological phase of the growth of a specified agricultural product. As another example, in some embodiments the agriculture attribute is humidity (or hours of daylight, etc.) at the grower on a given date; or average temperature at the grower over a specified date range, or average temperature at the grower during a specified phenological phase of the growth of a specified agricultural product.

Some embodiments then display one or more anomalies relating to agricultural attribute specified in the user profile. To that end, such embodiments include selecting a set of determined anomalies, each which is one of the identified anomalies, and which describes the agricultural attribute specified in the user profile. In some embodiments, selecting a set of determined anomalies includes selecting all determined anomalies.

In some embodiments the initial dataset comprises weather data for a specified geographic region, and the determined anomaly comprises an anomaly within the weather data.

For example, if the specified agricultural attribute is temperature at a grower during a specified phenological phase, then the system 200 selects for display to the user all identified anomalies within the temperature data in the initial dataset 192 (or the initial translated dataset) for that phenological phase.

As another example, in some embodiments a data item reports rainfall in a specific geographic location. Such a data item may be referred-to as a rainfall data item. The expected quantitative range defines an expected range of quantity of rainfall at that specific geographic location (the expected rainfall range). In this embodiment, comparing each data item in the set of data items from the common dataset to its expected quantitative range comprises comparing the rainfall data item to the expected rainfall range; and identifying as an anomaly each rainfall data item that falls outside of the expected rainfall range.

In some embodiments, causing display to the user of the determined anomaly on a display device includes providing the determined anomaly in an alert message to the user of the display device. In some embodiments, providing an alert message includes providing an alert contemporaneously with causing display of the determined anomaly.

In some embodiments, causing display to the user of the determined anomaly on a display device includes causing display of the determined anomaly pursuant to timing information specified by a user of the display device.

In some embodiments, causing display to the user of the determined anomaly on a display device includes causing display of the determined anomaly pursuant to user habits learned by the system 200 over time.

Anomaly Detection Using a Neural Network

In another embodiment, a trained neural network evaluates an initial dataset 192 (or initial translated dataset) to identify whether the received dataset 192 (or the initial translated dataset) includes one or more anomalies. Using a trained neural network to evaluate a dataset to identify whether the dataset includes one or more anomalies improves performance of the system in that the neural network can evaluate the dataset quickly and efficiently, using much less computer processor time and resources than other methods. In other words, using a trained neural network to evaluate a dataset to identify whether the dataset includes one or more anomalies makes the system more efficient, as compared to other methods.

In some embodiments, once the neural network determines that a dataset 192 (or the initial translated dataset) includes one or more anomalies, the anomalies may be specifically identified by the neural network, or in the ways described above.

For example, in some embodiments the neural network is configured (e.g., or trained, by virtue of its training) to detect anomalies in data items relating to a specified agricultural product.

In some embodiments, evaluating such a dataset with a neural network includes evaluating such a dataset with a neural network trained to detect anomalies in data items relating to a specified phenological phase of a specified agricultural product, the specified phenological phase selected from the plurality of phenological phases. Illustrative embodiments include a plurality of trained neural networks, such as a plurality of trained neural networks for each agricultural product, the plurality of trained neural networks including a trained neural network for each of one or more phenological phases of the agricultural product.

Such a neural network may contain one or more hidden layers. In illustrative embodiments, neural network may include 1, 2, 3, 4, 5, or 6 hidden layers, to name but a few examples.

Such a neural network is trained using a plurality of training datasets, each of which has a plurality of data items, and a corresponding results vector. In illustrative embodiments, the neural network, prior to training, is unweighted (or blank) in that the weights between the nodes are all equal.

Each training dataset includes a plurality of training data items, and the corresponding results vector indicates whether there is at least one anomaly within its corresponding training dataset. In illustrative embodiments, each training dataset has a plurality of data items over a period of time, such as a plurality of days, weeks or months. Each data item includes a quantitative measure of a factor that influences an agricultural product, such as temperature, humidity, and hours of daylight at the growing location or in the geographic region in which the agricultural product is grown.

An example of a training dataset having at least one anomaly, and a corresponding result vector (indicating that the training dataset has at least one anomaly) is presented in Table 8C. Some training sets do not include an anomaly, and corresponding result vector (indicating that the training dataset has no anomaly) is presented in Table 8D.

TABLE 8C

| Day | Temp | Humidity | Daylight | Result Vector |
|---|---|---|---|---|
| 0 | 25° C. | 60% | 10:00 | Yes |
| 1 | 26° C. | 50% | 10:05 | |
| 2 | 19° C. | 54% | 10:10 | |
| 3 | 25° C. | 63% | 10:15 | |
| 4 | 25° C. | 68% | 10:20 | |

An example of a training dataset having no anomalies, and corresponding result vector (indicating that the training dataset does not have at least one anomaly) is presented in Table 8D.

TABLE 8D

| Day | Temp | Humidity | Daylight | Result Vector |
|---|---|---|---|---|
| 0 | 25° C. | 60% | 10:00 | No |
| 1 | 26° C. | 58% | 10:05 | |
| 2 | 24° C. | 56% | 10:10 | |
| 3 | 25° C. | 63% | 10:15 | |
| 4 | 25° C. | 68% | 10:20 | |

Training the neural network includes applying to the neural network a plurality (or group) of training sets. In illustrative embodiments, training a neural network on a one-variable model (e.g., one of temperature, humidity, or daylight) may include providing to the neural network 4500 distinct training datasets, but the number of distinct training datasets to produce train the neural network will depend on the purpose and user requirements for which the neural network is being trained. Consequently, training a neural network may include providing to the neural network with more than 4500 distinct training datasets, or fewer than 4500 distinct training sets, depending on the datasets and the accuracy required for the application of the neural network.

In an illustrative embodiment, the group of training datasets (e.g., 4500 training datasets in keeping with the foregoing example) represent data gathered over a span of several years for a specific crop at a specific geographic location over that span of years. For example, in an illustrative embodiment, the set of training datasets represent data for e.g., strawberries in Salinas Washington, USA over ten years or ten growing seasons.

In some embodiments, training of the neural network is performed in batches. For example, training on 4500 training datasets may be performed by applying to the neural network 9 batches of 500 training datasets each, where the batches are applied in series to one another. For example, in some embodiments (e.g., depending on the complexity and/or the objective context of the output), a training model may divide the group of training datasets into smaller groups (each such group may be referred-to as a "batch"), each batch providing a variable training model improving the combinations yielded that will be fed into the overall training model. For example, the inventors have discovered that one run of 4500 training datasets as one large group does not produce the same trained neural network as running batches comprised of sub-sets of the 4500 training datasets, such as 9 batches of 500 distinct training datasets each. In some embodiments, the group of training datasets of agricultural data may be subdivided into batches based on corresponding different phases of a crop's growing season. For example, some embodiments may divide the training datasets into batches of (1) training datasets corresponding to the start of the growing season for that crop, and (2) training datasets corresponding to the middle or peak of the growing season for that crop, and (3) training datasets corresponding to the end of the growing season for that crop. In illustrative embodiments, the training dataset comprise agricultural data gathered for each such phase of the growing season of a geographic location over several years. Some embodiments may further divide the training datasets of each batch into smaller batches (e.g., 500 training datasets each).

Some embodiments train the neural network over several consecutive epochs. In illustrative embodiments, each epoch uses the same training data as the other epochs. In keeping with the foregoing example, each epoch may include 9 batches of 500 training datasets each. An illustrative embodiment trains the neural network by applying 15 epochs. Each epoch prior to the final epoch trains the neural network to an intermediate-trained state, and each subsequent epoch begins with the neural network in the intermediate-trained state produced at the end of the previous epoch. Ultimately the final epoch produces concludes the training of the neural network.

In illustrative embodiments having more than one variable (e.g., two or more of temperature, humidity, and daylight) typically include even more training sets and/or more epochs. The inventors have found that the number of training sets used to train the neural network goes up exponentially with the number of variables, as compared to training the neural network on a single variable. The number of training sets, and/or batches and/or epochs, can be determined by the system designer or neural network training person and may depend on one or more of the datasets and the accuracy required for the application of the neural network.

After training, the neural network is tested by applying one or more test datasets and assessing whether the trained neural network correctly identifies whether the test dataset includes at least one anomaly. If so, then the training is complete, and otherwise the neural network undergoes additional training, with additional training datasets, until the neural network correctly identifies whether a test dataset includes at least one anomaly.

Both the training datasets, and test datasets, may include actual historical data.

Illustrative embodiments employ a plurality of neural networks. For example, a system 200 may receive datafiles 190 (and corresponding datasets 192) from many sources, each in a different geographic region, and each reporting data for a different agricultural product at a different phenological phase. Thus, the system may have or obtain a different, trained neural network for each such source or geographic region, and for each agricultural product produced by that source or in that geographic region, and for each phenological phase of that agricultural product.

A listing of certain reference numbers is presented below.
100: Illustrative supply chain;
110: Source of product;
120: Transportation providers;
130: Wholesaler;
140: Retailer
150: Suppliers;
170: Information source;
180: Information consumer;
190: Datafile;
191: Signature;
192: Payload data;
193: Datum (or "data item");
200: System;
201: Hardware interface;
203: Network;
210: Data ingestion module;
220: API module;
230: Visualization module;
240: Alert notification module;
250: Content delivery module;
260: Content mining module;
270: APExS module;
280: Electronic memory;
290: Data repository;

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A method of providing timely information to a participant in an agricultural supply chain, the method implemented at least in part in a computer system having computer hardware or a combination of computer hardware and computer software, the method comprising: receiving, at a computer system, a plurality of datafiles (each a received datafile) from a plurality of curated remote sources, each received datafile containing a dataset from its corresponding curated source, and having a corresponding electronic file format selected from a plurality of distinct electronic file formats; for each received datafile: automatically determining its corresponding electronic file format; extracting its corresponding dataset (the extracted data) pursuant to its corresponding electronic file format; translating the extracted data into a common data format so that the extracted data from each received datafile is in the common data format; and loading the extracted data into an extracted data computer memory, the extracted data computer memory storing extracted data from each received datafile (the aggregate extracted data); formatting a subset of the aggregate extracted data into images for graphical display on a computer display screen; and causing display of the images on a computer display in response to a command from a participant in the agricultural supply chain to display the images.

One Click

P11. The method of P1, further comprising: storing, at a second memory location distinct from the extracted data computer memory, a display screen definition provided by the participant, the display screen definition defining a set of images for graphical display on the computer display; wherein causing display of the images on a computer display in response to a command from a participant in the agricultural supply chain to display the images comprises displaying the images pursuant to the display screen definition, and wherein the command from the participant comprises a single computer action by the participant.

P12. The method of P11 wherein the single computer action by the participant comprises a single mouse click.

P13. The method of P11 wherein the single computer action by the participant comprises a single screen swipe.

P14. The method of P11 wherein the single computer action by the participant comprises a single screen tap.

P15. The method of P11 wherein the single computer action by the participant comprises a double tap.

Contextualization; Translation

P21. The method of P1 wherein each dataset of the plurality of datasets is specified in a corresponding unit of measure, and wherein translating the extracted data into a common data format comprises: translating each unit of measure into a common unit of measure specified by the participant.

P22. The method of P21 wherein, for a first dataset of the plurality of datasets, the corresponding unit of measure specifies the weight of an agricultural product in kilograms, and the different unit of measure specifies the weight of the agricultural product in pounds.

P23. The method of P21 wherein, for a first dataset of the plurality of datasets, the corresponding unit of measure specifies the capacity of a shipping container in metric units, and the different unit of measure specifies capacity of a shipping container in imperial units.

P24. The method of P21, further comprising: providing a contextualization dictionary that correlates a source of an agricultural product to terms associated with the agricultural product and, for each such term, a corresponding alternative phrase for that term; each received datafile contains an identification of the source of the agricultural product to which the received datafile pertains; and for each term in the dataset, looking up that term in the contextualization dictionary and replacing, in the dataset, the term with its alternative phrase.

P25. The method of P24, wherein the contextualization dictionary includes the Spanish term "fresa" and its corresponding alternative phrase "strawberry," and the method comprises changing each occurrence of the term "fresa" in the dataset to "strawberry."

De-Duplication

P31. The method of P1 further comprising de-duplicating the plurality of received datafiles, the deduplicating comprising: receiving, at the computer system, later in-time versions of each received datafile (each a subsequent version of a received datafile); for each subsequent version of a received datafile: comparing the subsequent version to each previous version of the received datafile to determine whether the subsequent version is identical to any such previous version; and discarding the subsequent version when it is identical to any such previous version.

P32. The method of P31 wherein: each received datafile and comprises a plurality of data items, and each subsequent version comprises a corresponding plurality of subsequent data items; and comparing the subsequent version to each previous version of the received datafile comprises comparing each data item of the received datafile to each corresponding subsequent data item to determine whether each data item of the received datafile is identical to its corresponding subsequent data item.

P33. The method of P31, wherein: each received datafile and each subsequent version each contain (a) signature data identifying an agricultural product to which the received datafile and each subsequent version pertain; (b) an identification of the source of the agricultural product to which the received datafile and each subsequent version pertain; and (c) a date on which the received datafile or subsequent version, respectively, was generated; and comparing the subsequent version to each previous version of the received datafile to determine whether the subsequent version is identical to any such previous version includes comparing the signature data from the received datafile to the signature data of the subsequent version.

P34. The method of P31 further comprising, after translating the extracted data into a common data format, de-duplicating the extracted data.

P35. The method of P31, wherein: each received datafile and each subsequent version are characterized by a hash of its data; and comparing the subsequent version to each previous version of the received datafile to determine whether the subsequent version is identical to any such previous version includes automatically comparing the hash of the received datafile to the hash of the previous version.

Data Update

P41. The method of P1 further comprising: contemporaneously with translating the extracted data into a common data format, storing a snapshot of the extracted data in the common data format; at a subsequent time after translating the extracted data into a common data format, receiving an updated datafile corresponding to a one of the received datafiles, the updated datafile including a corresponding updated dataset, and subsequently: comparing the updated dataset to a corresponding snapshot; identifying differences (the identified differences) between the snapshot and the updated dataset; and updating the extracted data into the extracted data computer memory with the identified differences.

P42. The method of P41, wherein: each snapshot comprises a plurality of data items, and each updated dataset comprises a plurality of subsequent data items, each snapshot data item corresponding to a corresponding subsequent data item, and comparing the updated dataset to its corresponding snapshot comprises comparing each data item of the snapshot to its corresponding subsequent data item of the updated dataset; and for each corresponding subsequent data item that is not identical to its corresponding snapshot data item (each a changed datum): replacing a corresponding data item in the extracted data with the changed datum.

Incorporating User Proprietary Data

P51. The method of P1 further comprising: receiving, from a participant, proprietary recipient data; storing the propriety recipient data in a separate memory location from the extracted data computer memory; processing the propriety recipient data together with the extracted data to produce hybrid proprietary data; and wherein formatting a subset of the aggregate extracted data into images for graphical display on a computer display screen comprises formatting the hybrid proprietary data into images for graphical display on a computer display screen.

P52. The method of P51, wherein the received proprietary recipient data is received in an encrypted format, and the method further comprises decrypting the proprietary recipient data prior to processing the propriety recipient data together with the reformatted datasets to produce hybrid proprietary data.

P53. The method of P51, further comprising discarding the proprietary recipient data contemporaneously with conclusion of the processing the propriety recipient data together with the reformatted datasets to produce hybrid proprietary data.

P54. The method of P51 wherein storing the propriety recipient data in a separate memory location from the extracted data computer memory comprises storing the propriety recipient data only in volatile memory.

P55. The method of P51 wherein storing the propriety recipient data in a separate memory location from the extracted data computer memory comprises storing the propriety recipient data only in volatile RAM.

APExS

P61. The method of P1 wherein each received datafile includes signature data comprising identification of an agriculture product that is the subject of the dataset in the received datafile, and identification of a geographic origin of the agricultural product, and the method further comprises: accessing a crop yield correlator (APExS); receiving, at the computer system, a weather report for the geographic origin of the agricultural product; and applying the weather report to the crop yield correlator to produce an objective prediction of the impact of the weather report to expected crop yield at a future harvest time.

P62. The method of P61 wherein: the crop yield correlator comprises a matrix of crop yield impact (a lookup table), the matrix indexed by indexing weather factors; and the weather report comprises a vector comprising weather factors corresponding to the indexing weather factors, the weather factors including at least temperature and humidity at the geographic location; and applying the weather report to the crop yield correlator comprises identifying a crop yield impact by correlating the weather factors to the indexing weather factors to identify a unique objective prediction of the impact of the weather factors to expected crop yield at a future harvest time.

P62. The method of P61 wherein: the crop yield correlator comprises a neural network trained by weather training vectors to predict the impact of the weather factors to expected crop yield at a future harvest time.

P63. The method of P62 wherein: the crop yield correlator is configured to predict the impact of the weather factors on expected crop yield at a future harvest time for a specified agricultural product, the specified agricultural product having a corresponding set of phenological phases, and the crop yield correlator comprises a plurality of neural networks, including a respective neural network corresponding to each phenological phase of the set of phenological phases, each corresponding neural network trained to predict the impact of the weather factors during its associated phenological phase to expected crop yield at a future harvest time.

P64. The method of P61 wherein the weather report is a weather forecast for a future time.

P65. The method of P61 wherein the weather report is a weather forecast for a future phenological phase.

Various embodiments of this disclosure may be implemented at least in part in any conventional computer programming language. For example, some embodiments may be implemented in a procedural programming language (e.g., "C"), or in an object-oriented programming language (e.g., "C++"), or in Python, R, Java, LISP or Prolog. Other embodiments of this disclosure may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of this disclosure may be implemented as a combination of both software (e.g., a computer program product) and hardware. Still other embodiments of this disclosure are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments described above are intended to be merely exemplary; numerous variations and modifications will be apparent to those skilled in the art. All such variations and modifications are intended to be within the scope of the present disclosure as defined in any appended claims.

What is claimed is:

1. A computer-implemented method comprising:
   training a neural network to detect anomalies, by
      providing a first training set comprising a plurality of data items relating to the specified phenological phase and having anomalies, the plurality of data items selected from temperature at the growing location during the specified phenological phase, humidity at the growing location during the specified phenological phase, and hours of daylight at the growing location during the specified phenological phase;
   training the neural network using the first training set;
   providing a second training set comprising a plurality of data items relating to the specified phenological phase and having no anomalies, the plurality of data items selected from temperature at the growing location during the specified phenological phase, humidity at the growing location during the specified phenological phase, and hours of daylight at the growing location during the specified phenological phase; and
   training the neural network using the second training set;
   receiving, at a computer system, a plurality of datafiles from a plurality of remote sources, the plurality of datafiles being received datafiles, each received datafile of the received datafiles containing an initial dataset from a corresponding one of the remote sources, and having a corresponding electronic file format; and for each received datafile, operating one or more processors to execute code to:
- extract the initial dataset and translate the initial dataset into a uniform data format to produce an initial translated dataset; and
- store the initial translated dataset into computer memory as part of a common dataset;
- evaluate, using the one or more processors, an evaluated dataset with the neural network to identify a set of one or more anomalies, each an identified anomaly, the evaluated dataset being one of the initial dataset or the initial translated dataset;
- access a profile of a user, the user profile identifying an agricultural attribute;
- identify an anomaly that correlates to the agricultural attribute identified in the user profile, said anomaly being an identified anomaly; and thereafter to
- output the identified anomaly to a user device.

2. The method of claim 1, wherein the evaluated dataset comprises weather data for a specified geographic region, and the anomaly comprises an anomaly within the weather data.

3. The method of claim 1, wherein:
the evaluated dataset comprises a set of data items, each data item in the set of data items having an expected quantitative range for the specified agricultural attribute, and an anomaly comprises a data item having a quantitative value that is outside of its expected quantitative range; and wherein
to evaluate the evaluated dataset to identify one or more anomalies comprises:
- comparing each data item in the evaluated dataset to its expected quantitative range, and identifying as an identified anomaly each data item that has a quantitative value that exceeds its expected quantitative range.

4. The method of claim 3 wherein:
the evaluated dataset comprises a data item reporting a quantitative value of rainfall in a specific geographic location (a rainfall data item);
the expected quantitative range comprises an expected quantity of rainfall at that specific geographic location (the expected rainfall range); and
comparing each data item in the set of data items from the evaluated dataset to its expected quantitative range comprises comparing the rainfall data item to the expected rainfall range; and
identifying as an anomaly each rainfall data item that falls outside of the expected rainfall range.

5. The method of claim 1, wherein:
each evaluated dataset comprises a set of data items, each data item in the set of data items having an expected quantitative value, and an anomaly comprises a data item that deviates by at least a corresponding quantitative amount from its expected quantitative value; and wherein
to evaluate the evaluated dataset to identify one or more anomalies comprises comparing each data item in the evaluated dataset to its expected quantitative value, and identifying as an identified anomaly each data item that deviates from its expected quantitative value by at least its corresponding quantitative amount.

6. The method of claim 1, wherein
the evaluated dataset comprises data items relating to the specified agricultural product for transport by the agricultural supply chain; and wherein
to evaluate the evaluated dataset to identify one or more anomalies comprises evaluating the evaluated dataset with a neural network trained to detect anomalies in data items relating to the specified agricultural product.

7. The method of claim 1, wherein
the evaluated dataset comprises data items relating to a specified agricultural product for transport by the agricultural supply chain, the specified agricultural product having a plurality of phenological phases; and wherein
to evaluate the evaluated dataset to identify one or more anomalies comprises evaluating the initial dataset with a neural network trained to detect anomalies in data items relating to a specified phenological phase of the specified agricultural product, the specified phenological phase being one of the plurality of phenological phases.

8. The method of claim 1, further comprising:
storing a snapshot of each initial translated dataset;
at a time subsequent to receiving the plurality of datafiles from a plurality of remote sources, receiving at the computer system an updated datafile corresponding to a one of the received datafiles, the updated datafile including a corresponding updated dataset, and subsequently:
- comparing the updated dataset to a corresponding snapshot;
- identifying a set of data items in the updated dataset that are different from corresponding data items in the corresponding snapshot (the identified differences) between the snapshot and the updated dataset; and
- updating the common dataset by replacing in the common dataset each such corresponding data item the with data items in the updated dataset that is different from corresponding data item.

9. The method of claim 1, further comprising:
generating a hash, said hash being the earlier hash, of each initial dataset;
at a time subsequent to receiving the plurality of datafiles from a plurality of remote sources, receiving at the computer system a plurality of subsequent datafiles, each subsequent datafile including a subsequent dataset corresponding to the initial dataset of a corresponding one of the received datafiles, at least one of the subsequent datasets being an updated version of its corresponding initial dataset;
generating a later hash for each subsequent dataset;
identifying a set of subsequent datafiles having an updated dataset by comparing, for each initial translated dataset and its corresponding subsequent dataset, the initial hash to the later hash;
and subsequently, for each subsequent datafile having an updated dataset:
- comparing the updated dataset to a corresponding snapshot;
- identifying differences, said differences being identified differences, between the snapshot and the updated dataset; and
updating the common dataset with the identified differences to produce an updated common dataset.

10. The method of claim 1, wherein to output the identified anomaly to a user device comprises causing display of the identified anomaly in a visual format specified by the user profile corresponding to a user of the display device.

11. The method of claim 1, wherein to output the identified anomaly to a user device comprises:
providing the identified anomaly in an alert message to the user of the display device.

12. The method of claim 1, wherein to output the identified anomaly to a user device comprises:
causing display of the identified anomaly on a display device pursuant to timing information previously specified by a user of the display device.

13. The method of claim 1, wherein to output the identified anomaly to a user device comprises:
causing display of the identified anomaly on a display device pursuant to user habits learned by the system over time.

14. The method of claim 1, further comprising providing an alert contemporaneously with causing display of the selected anomalies.

15. The method of claim 1, wherein the user profile includes an agricultural attribute specified by a user.

16. The method of claim 1, wherein the user profile includes a user's subscription to a specified agricultural attribute.

17. The method of claim 1 wherein:
to access a user profile identifying at least one agricultural attribute comprises accessing a user application instance on a user's device having the user profile; and
to output the identified anomaly to a user device comprises causing display to the user of the identified anomaly on the user's device.

18. A computer-implemented system comprising a computer system configured to execute computer-executable instructions which instructions, when executed, cause the computer system to execute a method, the method comprising:
training a neural network to detect anomalies, by
providing a first training set comprising a plurality of data items relating to the specified phenological phase and having anomalies, the plurality of data items selected from temperature at the growing location during the specified phenological phase, humidity at the growing location during the specified phenological phase, and hours of daylight at the growing location during the specified phenological phase;
training the neural network using the first training set;
providing a second training set comprising a plurality of data items relating to the specified phenological phase and having no anomalies, the plurality of data items selected from temperature at the growing location during the specified phenological phase, humidity at the growing location during the specified phenological phase, and hours of daylight at the growing location during the specified phenological phase; and
training the neural network using the second training set;
receiving, at the computer system, a plurality of datafiles from a plurality of remote sources, the plurality of datafiles being received datafiles, each received datafile of the received datafiles containing an initial dataset from a corresponding one of the remote sources, and having a corresponding electronic file format; and
for each received datafile:
extracting the initial dataset and translating the initial dataset into a uniform data format to produce an initial translated dataset; and
storing the initial translated dataset into computer memory as part of a common dataset;
evaluating the initial dataset with the neural network to identify one or more anomalies (each an identified anomaly);
accessing a user profile identifying at least one agricultural attribute;
selecting a set of anomalies (the selected anomalies), each anomaly of the selected anomalies being an identified anomaly that describes the agricultural attribute identified in the user profile; and thereafter
outputting the identified anomaly to a user device.

19. The computer-implemented system of claim 18, further comprising a computer-implemented neural network, the neural network configured to evaluate the initial dataset to identify one or more anomalies in data items relating to a specified phenological phase of a specified agricultural product, the specified phenological phase selected from a plurality of phenological phases for the specified agricultural product.

20. A non-transitory non-volatile storage medium configured to store computer-executable instructions, which computer-executable instructions, when executed by a computer processor, cause the computer processor to execute a method, the method comprising:
training a neural network to detect anomalies, by
providing a first training set comprising a plurality of data items relating to the specified phenological phase and having anomalies, the plurality of data items selected from temperature at the growing location during the specified phenological phase, humidity at the growing location during the specified phenological phase, and hours of daylight at the growing location during the specified phenological phase;
training the neural network using the first training set;
providing a second training set comprising a plurality of data items relating to the specified phenological phase and having no anomalies, the plurality of data items selected from temperature at the growing location during the specified phenological phase, humidity at the growing location during the specified phenological phase, and hours of daylight at the growing location during the specified phenological phase; and
training the neural network using the second training set;
receiving, at the computer system, a plurality of datafiles from a plurality of remote sources, the plurality of datafiles being received datafiles, each received datafile of the received datafiles containing an initial dataset from a corresponding one of the remote sources, and having a corresponding electronic file format; and
for each received datafile:
extracting the initial dataset and translating the initial dataset into a uniform data format to produce an initial translated dataset; and
storing the initial translated dataset into computer memory as part of a common dataset;
evaluating the initial dataset with the neural network to identify an anomaly, said anomaly being an identified anomaly;

accessing a user profile identifying at least one agricultural attribute; and thereafter outputting the identified anomaly to a user device.

\* \* \* \* \*